(12) United States Patent
Suzuki et al.

(10) Patent No.: US 10,728,800 B2
(45) Date of Patent: Jul. 28, 2020

(54) TERMINAL DEVICE, BASE STATION DEVICE, COMMUNICATION METHOD, AND INTEGRATED CIRCUIT

(71) Applicant: Sharp Kabushiki Kaisha, Sakai, Osaka (JP)

(72) Inventors: Shoichi Suzuki, Sakai (JP); Tatsushi Aiba, Sakai (JP); Kazunari Yokomakura, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 141 days.

(21) Appl. No.: 15/771,413

(22) PCT Filed: Nov. 4, 2016

(86) PCT No.: PCT/JP2016/082870
§ 371 (c)(1),
(2) Date: Apr. 27, 2018

(87) PCT Pub. No.: WO2017/078165
PCT Pub. Date: May 11, 2017

(65) Prior Publication Data
US 2018/0317129 A1 Nov. 1, 2018

(30) Foreign Application Priority Data

Nov. 6, 2015 (JP) .................. 2015-218217

(51) Int. Cl.
*H04W 72/04* (2009.01)
*H04W 28/06* (2009.01)
(Continued)

(52) U.S. Cl.
CPC ......... *H04W 28/065* (2013.01); *H04L 5/0048* (2013.01); *H04W 72/04* (2013.01);
(Continued)

(58) Field of Classification Search
CPC ... H04W 28/065; H04W 72/04; H04W 72/14; H04W 72/042; H04W 76/27; H04L 5/0048
See application file for complete search history.

(56) References Cited

U.S. PATENT DOCUMENTS

2014/0348092 A1* 11/2014 Ihm ...................... H04J 11/0079
370/329
2016/0302174 A1* 10/2016 Chatterjee ............ H04B 7/0486

FOREIGN PATENT DOCUMENTS

EP 2 775 640 A1 9/2014

OTHER PUBLICATIONS

Nokia Networks; "On USS Definition for Enhanced CA Beyond 5 CCs"; 3GPP TSG-RAN WG1; Meeting #81; R1-152818; May 25-29, 2015; 3 pages.

(Continued)

*Primary Examiner* — Lakeram Jangbahadur
(74) *Attorney, Agent, or Firm* — Keating & Bennett, LLP

(57) ABSTRACT

A terminal device and a base station device can efficiently communicate with each other by using a downlink channel. The terminal device monitors, in a subframe k, a first set $S_k^{(L)}$ of first PDCCH candidates and a second set $S_k(L)$ of second PDCCH candidates. A first number $M_c^{(L)}$ of first PDCCH candidates is given based on first $\alpha_c$ and $M^{(L)}$, and a second number $M_c^{(L)}$ of second PDCCH candidates is given based on second $\alpha_c$ and $M^{(L)}$. First CCE(s) corresponding to an m-th first PDCCH candidate included in the first set $S_k^{(L)}$ and a second CCE(s) corresponding to an m-th second PDCCH candidate included in the second set are given by an expression below. $N_{CCE,k}$ is a total number of CCEs in the subframe k, and L is an aggregation level.

4 Claims, 16 Drawing Sheets

(51) Int. Cl.
H04W 76/27 (2018.01)
H04L 5/00 (2006.01)
H04W 72/14 (2009.01)

(52) U.S. Cl.
CPC ......... *H04W 72/042* (2013.01); *H04W 72/14* (2013.01); *H04W 76/27* (2018.02)

(56) References Cited

OTHER PUBLICATIONS

Nokia Networks et al., "WF on number of blind decodes", 3GPP TSG-RAN WG1 Meeting #82bis, R1-156130, Oct. 5-9, 2015, 2 pages.
"3rd Generation Partnership Project; Technical Specification Group Radio Access Network; Evolved Universal Terrestrial Radio Access (E-UTRA); Physical channels and modulation (Release 12)", 3GPP TS 36.211 V12.7.0, Sep. 2015, pp. 1-136.
"3rd Generation Partnership Project; Technical Specification Group Radio Access Network; Evolved Universal Terrestrial Radio Access (E-UTRA); Multiplexing and channel coding (Release 12)", 3GPP TS 36.212 V12.6.0, Sep. 2015, pp. 1-95.
"3rd Generation Partnership Project; Technical Specification Group Radio Access Network; Evolved Universal Terrestrial Radio Access (E-UTRA); Physical layers procedures (Release 12)", 3GPP TS 36.213 V12.7.0, Sep. 2015, pp. 1-241.

\* cited by examiner

TERMINAL DEVICE, BASE STATION DEVICE, COMMUNICATION METHOD, AND INTEGRATED CIRCUIT

TECHNICAL FIELD

The present invention relates to a terminal device, a base station device, a communication method, and an integrated circuit.

This application claims priority based on JP 2015-218217 filed on Nov. 6, 2015, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied. In LTE, a base station device is also referred to as an evolved NodeB (eNodeB), and a terminal device is also referred to as a User Equipment (UE). LTE is a cellular communication system in which multiple areas each covered by the base station device are deployed to form a cellular structure. A single base station device may manage multiple cells.

In 3GPP, career aggregation has been specified which allows a terminal device to perform simultaneous transmission and/or reception in multiple serving cells (component careers).

NPL 1 proposes configuring, for each serving cell and aggregation level, the number of PDCCH candidates included in a User Equipment-specific Search Space (USS) monitored by a terminal device. Furthermore, NPL 1 proposes introducing, for each serving cell, deactivation of monitoring of a DCI format 0/1A.

CITATION LIST

Non Patent Literature

NPL 1: "WF on number of blind decodes", R1-156130, Nokia Networks, Lenovo, 3GPP TSG RAN Meeting #82bis, Malmo, Sweden, 5-9 Oct. 2015.
NPL 2: "3GPP TS 36.211 V12.7.0 (2015-September)", 25 Sep. 2015.
NPL 3: "3GPP TS 36.212 V12.6.0 (2015-September)", 25 Sep. 2015.
NPL 4: "3GPP TS 36.213 V12.7.0 (2015-March)", 25 Sep. 2015.

SUMMARY OF INVENTION

Problems to be Solved by the Invention

The present invention provides a terminal device capable of efficiently communicating with a base station device by using a downlink channel, a base station device communicating with the terminal device, a communication method used for the terminal device, a communication method used for the base station device, an integrated circuit mounted on the terminal device, and an integrated circuit mounted on the base station device. For example, a USS monitored by the terminal device is efficiently designed/defined. The communication method used for the terminal device may include an efficient method of monitoring the USS by the terminal device. The communication method used for the base station device may include an efficient transmission method in a downlink channel to the terminal device.

Means for Solving the Problems (1) According to some aspects of the present invention, the following measures are provided. That is, according to a first aspect of the present invention, a terminal device includes an antenna unit configured to receive a Physical Downlink Control Channel (PDCCH); and a radio transmission and/or reception unit configured to monitor, in a subframe k, a first set $S_k^{(L)}$ of first PDCCH candidates and a second set $S_k^{(L)}$ of second PDCCH candidates. The first set $S_k^{(L)}$ corresponds to a first Carrier Indicator Field (CIF) value $n_{CI}$ and a first aggregation level L, and the second set $S_k^{(L)}$ corresponds to a second CIF value $n_{CI}$ and the first aggregation level L. A first number $M_c^{(L)}$ of the first PDCCH candidates is given based on at least $\alpha_c$ indicated by first information and $M^{(L)}$, and a second number $M_c^{(L)}$ of the second PDCCH candidates is given based on at least $\alpha_c$ indicated by second information and the $M^{(L)}$. First Control Channel Element(s) (CCE(s)) corresponding to an m-th first PDCCH candidate included in the first set $S_k^{(L)}$ and second CCE corresponding to an m-th second PDCCH candidate included in the second set are given by expressions below. $N_{CCE,k}$ is a total number of CCEs in the subframe k, floor is a function for returning a value obtained by truncating an input value below a decimal point, and A mod B is a function for returning a remainder obtained by dividing A by B.

$$L\{(Y_k+m') \bmod \text{floor}(N_{CCE,k}/L)\}+i \qquad \text{[Expression 1]}$$

where i=0, 1, . . . , L−1

$$m'=m+M^{(L)}\cdot n_{CI} \qquad \text{[Expression 2]}$$

where m=0, 1, . . . , $M_c^{(L)}$−1

(2) According to a second aspect of the present invention, a base station device includes a radio transmission and/or reception unit configured to code Downlink Control Information transmitted using a Physical Downlink Control Channel (PDCCH); and an antenna unit configured to transmit the PDCCH in each of a first set $S_k^{(L)}$ of first PDCCH candidates and a second set $S_k^{(L)}$ of second PDCCH candidates in a subframe k. The first set $S_k^{(L)}$ corresponds to a first Carrier Indicator Field (CIF) value $n_{CI}$ and a first aggregation level L, and the second set $S_k^{(L)}$ corresponds to a second CIF value $n_{CI}$ and the first aggregation level L. A first number $M_c^{(L)}$ of the first PDCCH candidates is given based on at least $\alpha_c$ indicated by first information and $M^{(L)}$, and a second number $M_c^{(L)}$ of the second PDCCH candidates is given based on at least $\alpha_c$ indicated by second information and the $M^{(L)}$. First Control Channel Element(s) (CCE(s)) corresponding to an m-th first PDCCH candidate included in the first set $S_k^{(L)}$ and a-second CCE(s) corresponding to an m-th second PDCCH candidate included in the second set are given by expressions below. $N_{CCE,k}$ is a total number of CCEs in the subframe k, floor is a function for returning a value obtained by truncating an input value below a decimal point, and A mod B is a function for returning a remainder obtained by dividing A by B.

$$L\{(Y_k+m') \bmod \text{floor}(N_{CCE,k}/L)\}+i \qquad \text{[Expression 3]}$$

where i=0, 1, . . . , L−1

$$m'=m+M^{(L)}\cdot n_{CI} \qquad \text{[Expression 4]}$$

where m=0, 1, . . . , $M_c^{(L)}$−1

(3) According to a third aspect of the present invention, a communication method to be used for a terminal device, the method including the steps of: receiving a Physical Downlink Control Channel (PDCCH); and monitoring, in a subframe k, a first set $S_k^{(L)}$ of first PDCCH candidates and a second set $S_k^{(L)}$ of second PDCCH candidates. The first set $S_k^{(L)}$ corresponds to a first Carrier Indicator Field (CIF) value $n_{CI}$ and a first aggregation level L, and the second set $S_k^{(L)}$ corresponds to a second CIF value $n_{CI}$ and the first aggregation level L. A first number $M_c^{(L)}$ of the first PDCCH candidates is given based on at least ac indicated by first information and $M^{(L)}$, and a second number $M_c^{(L)}$ of the second PDCCH candidates is given based on at least $\alpha_c$ indicated by second information and the $M^{(L)}$. First Control Channel Element(s) (CCE(s)) corresponding to an m-th first PDCCH candidate included in the first set $S_k^{(L)}$ and second CCE(s) corresponding to the m-th second PDCCH candidate included in the second set are given by expressions below. $N_{CCE,k}$ is a total number of CCEs in the subframe k, floor is a function for returning a value obtained by truncating an input value below a decimal point, and A mod B is a function for returning a remainder obtained by dividing A by B.

$$L\{(Y_k+m') \bmod \text{floor}(N_{CCE,k}/L)\}+i \quad \text{[Expression 5]}$$

where i=0, 1, . . . , L−1

$$m'=m+M^{(L)} \cdot n_{CI} \quad \text{[Expression 6]}$$

where m=0, 1, . . . , $M_c^{(L)}$−1

(4) According to a fourth aspect of the present invention, a communication method to be used for a base station device, the method including the steps of: coding Downlink Control Information transmitted by using a Physical Downlink Control Channel (PDCCH); and transmitting the PDCCH in each of a first set $S_k^{(L)}$ of first PDCCH candidates and a second set $S_k^{(L)}$ of second PDCCH candidates in a subframe k. The first set $S_k^{(L)}$ corresponds to a first Carrier Indicator Field (CIF) value $n_{CI}$ and a first aggregation level L, and the second set $S_k^{(L)}$ corresponds to a second CIF value $n_{CI}$ and the first aggregation level L. A first number $M_c^{(L)}$ of the first PDCCH candidates is given based on at least $\alpha_c$ indicated by first information and $M^{(L)}$, and a second number $M_c^{(L)}$ of the second PDCCH candidates is given based on at least $\alpha_c$ indicated by second information and the $M^{(L)}$. First Control Channel Element(s) (CCE(s)) corresponding to an m-th first PDCCH candidate included in the first set $S_k^{(L)}$ and second CCE(s) corresponding to an m-th second PDCCH candidate included in the second set are given by expressions below. $N_{CCE,k}$ is a total number of CCEs in the subframe k, floor is a function for returning a value obtained by truncating an input value below a decimal point, and A mod B is a function for returning a remainder obtained by dividing A by B.

$$L\{(Y_k+m') \bmod \text{floor}(N_{CCE,k}/L)\}+i \quad \text{[Expression 7]}$$

where i=0, 1, . . . , L−1

$$m'=m+M^{(L)} \cdot n_{CI} \quad \text{[Expression 8]}$$

where m=0, 1, . . . , $M_c^{(L)}$−1

(1) According to some aspects of the present invention, the following measures are provided. That is, according to a first aspect of the present invention, a terminal device includes an antenna unit configured to receive a Physical Downlink Control Channel (PDCCH); and a radio transmission and/or reception unit configured to monitor, in a subframe k, a first set $S_k^{(L)}$ of first PDCCH candidates and a second set $S_k^{(L)}$ of second PDCCH candidates. The first set $S_k^{(L)}$ corresponds to a first Carrier Indicator Field (CIF) value $n_{CI}$ and a first aggregation level L, and the second set $S_k^{(L)}$ corresponds to a second CIF value $n_{CI}$ and the first aggregation level L. A first number $M_c^{(L)}$ of the first PDCCH candidates is given based on at least $\alpha_c$ indicated by first information and $M^{(L)}$, and a second number $M_c^{(L)}$ of the second PDCCH candidates is given based on at least $\alpha_c$ indicated by second information and the $M^{(L)}$. A first Control Channel Element (CCE) corresponding to an m-th first PDCCH candidate included in the first set $S_k^{(L)}$ and a second CCE corresponding to an m-th second PDCCH candidate included in the second set are given by expressions below. $N_{CCE,k}$ is a total number of CCEs in the subframe k, floor is a function for returning a value obtained by truncating an input value below a decimal point, and A mod B is a function for returning a remainder obtained by dividing A by B.

$$L\{(Y_k+m') \bmod \text{floor}(N_{CCE,k}/L)\}+i \quad \text{[Expression 1]}$$

where i=0, 1, . . . , L−1

$$m'=m+M^{(L)} \cdot n_{CI} \quad \text{[Expression 2]}$$

where m=0, 1, . . . , $M_c^{(L)}$−1

(2) According to a second aspect of the present invention, a base station device includes a radio transmission and/or reception unit configured to code Downlink Control Information transmitted using a Physical Downlink Control Channel (PDCCH); and an antenna unit configured to transmit the PDCCH in each of a first set $S_k^{(L)}$ of first PDCCH candidates and a second set $S_k^{(L)}$ of second PDCCH candidates in a subframe k. The first set $S_k^{(L)}$ corresponds to a first Carrier Indicator Field (CIF) value $n_{CI}$ and a first aggregation level L, and the second set $S_k^{(L)}$ corresponds to a second CIF value $n_{CI}$ and the first aggregation level L. A first number $M_c^{(L)}$ of the first PDCCH candidates is given based on at least $\alpha_c$ indicated by first information and $M^{(L)}$, and a second number $M_c^{(L)}$ of the second PDCCH candidates is given based on at least $\alpha_c$ indicated by second information and the $M^{(L)}$. A first Enhanced Control Channel Element (CCE) corresponding to an m-th first PDCCH candidate included in the first set $S_k^{(L)}$ and a second CCE corresponding to an m-th second PDCCH candidate included in the second set are given by expressions below. $N_{CCE,k}$ is a total number of CCEs in the subframe k, floor is a function for returning a value obtained by truncating an input value below a decimal point, and A mod B is a function for returning a remainder obtained by dividing A by B.

$$L\{(Y_k+m') \bmod \text{floor}(N_{CCE,k}/L)\}+i \quad \text{[Expression 3]}$$

where i=0, 1, . . . , L−1

$$m'=m+M^{(L)} \cdot n_{CI} \quad \text{[Expression 4]}$$

where m=0, 1, . . . , $M_c^{(L)}$−1

(3) According to a third aspect of the present invention, a communication method to be used for a terminal device, the method including the steps of: receiving a Physical Downlink Control Channel (PDCCH); and monitoring, in a subframe k, a first set $S_k^{(L)}$ of first PDCCH candidates and a second set $S_k^{(L)}$ of second PDCCH candidates. The first set $S_k^{(L)}$ corresponds to a first Carrier Indicator Field (CIF) value $n_{CI}$ and a first aggregation level L, and the second set $S_k^{(L)}$ corresponds to a second CIF value $n_{CI}$ and the first aggregation level L. A first number NV') of the first PDCCH candidates is given based on at least $\alpha_c$ indicated by first information and $M^{(L)}$, and a second number $M_c^{(L)}$ of the second PDCCH candidates is given based on at least $\alpha_c$ indicated by second information and the $M^{(L)}$. A first Control Channel Element (CCE) corresponding to an m-th first PDCCH candidate included in the first set $S_k^{(L)}$ and a second CCE corresponding to the m-th second PDCCH candidate included in the second set are given by expressions below.

$N_{CCE,k}$ is a total number of CCEs in the subframe k, floor is a function for returning a value obtained by truncating an input value below a decimal point, and A mod B is a function for returning a remainder obtained by dividing A by B.

$$L\{(Y_k+m') \bmod \mathrm{floor}(N_{CCE,k}/L)\}+i \quad \text{[Expression 5]}$$

where i=0, 1, ..., L−1

$$m'=m+M^{(L)} \cdot n_{CI} \quad \text{[Expression 6]}$$

where m=0, 1, ..., $M_c^{(L)}-1$ (4) According to a fourth aspect of the present invention, a communication method to be used for a base station device, the method including the steps of: coding Downlink Control Information transmitted by using a Physical Downlink Control Channel (PDCCH); and transmitting the PDCCH in each of a first set $S_k^{(L)}$ of first PDCCH candidates and a second set $S_k^{(L)}$ of second PDCCH candidates in a subframe k. The first set $S_k^{(L)}$ corresponds to a first Carrier Indicator Field (CIF) value $n_{CI}$ and a first aggregation level L, and the second set $S_k^{(L)}$ corresponds to a second CIF value $n_{CI}$ and the first aggregation level L. A first number $M_c^{(L)}$ of the first PDCCH candidates is given based on at least $\alpha_c$ indicated by first information and $M^{(L)}$, and a second number $M_c^{(L)}$ of the second PDCCH candidates is given based on at least $\alpha_c$ indicated by second information and the $M^{(L)}$. A first Enhanced Control Channel Element (CCE) corresponding to an m-th first PDCCH candidate included in the first set $S_k^{(L)}$ and a second CCE corresponding to an m-th second PDCCH candidate included in the second set are given by expressions below. $N_{CCE,k}$ is a total number of CCEs in the subframe k, floor is a function for returning a value obtained by truncating an input value below a decimal point, and A mod B is a function for returning a remainder obtained by dividing A by B.

$$L\{(Y_k+m') \bmod \mathrm{floor}(N_{CCE,k}/L)\}+i \quad \text{[Expression 7]}$$

where i=0, 1, ..., L−1

$$m'=m+M^{(L)} \cdot n_{CI} \quad \text{[Expression 8]}$$

where m=0, 1, ..., $M_c^{(L)}-1$

Effects of the Invention

According to the present invention, a terminal device and a base station device can efficiently communicate with each other by using a downlink channel.

MODE FOR CARRYING OUT THE INVENTION

Embodiments of the present invention will be described below.

Figure 1:
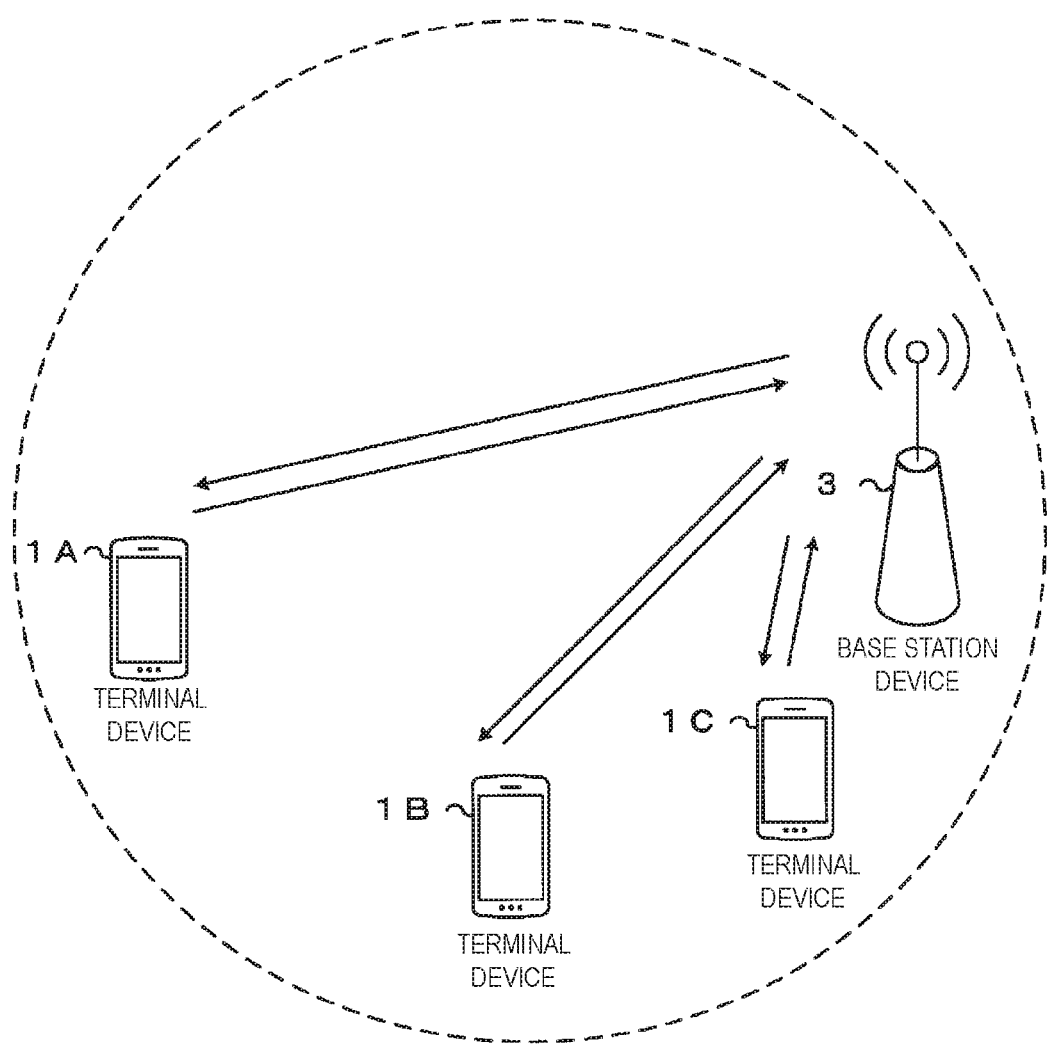
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. Each of the terminal devices 1A to 1C is referred to as a terminal device 1 below.

Now, carrier aggregation will be described.

In the present embodiment, multiple serving cells are configured for the terminal device 1. A technology in which the terminal device 1 communicates via the multiple serving cells is referred to as cell aggregation or carrier aggregation. The present invention may be applied to each of the multiple serving cells configured for the terminal device 1. Furthermore, the present invention may be applied to some of the configured multiple serving cells. Furthermore, the present invention may be applied to each of groups of the configured multiple serving cells. Furthermore, the present invention may be applied to some of the groups of the configured multiple serving cells. In carrier aggregation, the configured multiple serving cells are also referred to as aggregated serving cells.

Time Division Duplex (TDD) and/or Frequency Division Duplex (FDD) is applied to a radio communication system in the present embodiment. In a case of cell aggregation, serving cells to which TDD is applied and serving cells to which FDD is applied may be aggregated.

The configured multiple serving cells include one primary cell and one or multiple secondary cells. The primary cell is a serving cell in which an initial connection establishment procedure has been performed, a serving cell in which a connection re-establishment procedure has been started, or a cell indicated as a primary cell during a handover procedure. At the point in time when a Radio Resource Control (RRC) connection is established, or later, a secondary cell may be configured.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 can perform simultaneous transmission on multiple physical channels/of multiple physical signals in the multiple serving cells (component careers) to be aggregated. The terminal device 1 can perform simultaneous reception on multiple physical channels/of multiple physical signals in the multiple serving cells (component careers) to be aggregated.

Figure 2:
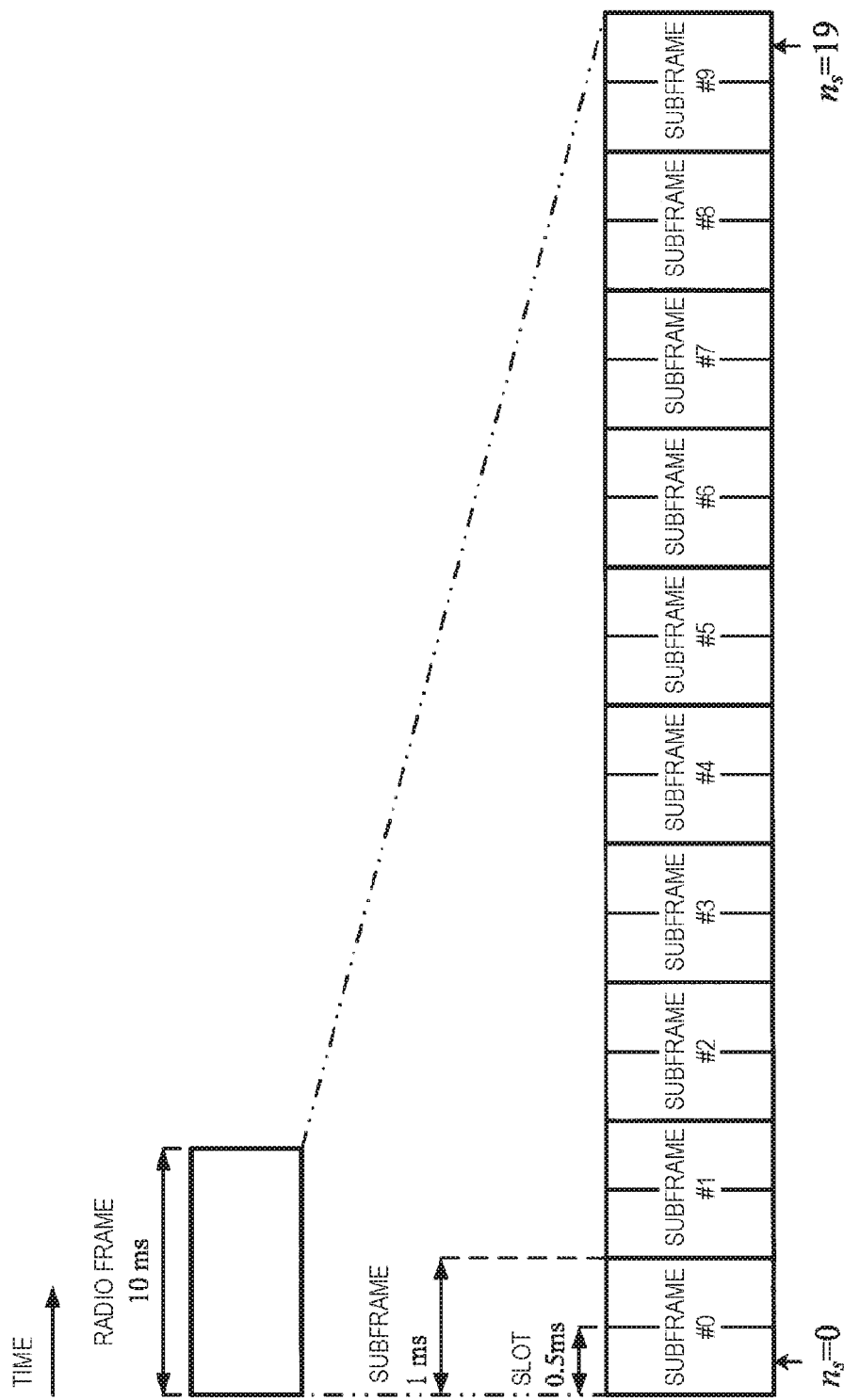
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis.

Various field sizes in a time domain are expressed by the number of time units Ts=1/(15000×2048) seconds. The length of the radio frame is Tf=307200×Ts=10 ms. Each of the radio frames includes ten contiguous subframes in the time domain. The length of each subframe is Tsubframe=30720×Ts=1 ms. Each of the subframes i includes two contiguous slots in the time domain. The two contiguous slots in the time domain are a slot having a slot number ns of 2i in the radio frame and a slot having a slot number ns of 2i+1 in the radio frame. The length of each slot is Tslot=153600×ns=0.5 ms. Each of the radio frames includes ten contiguous subframes in the time domain. Each of the radio frames includes 20 contiguous slots (ns=0, 1, . . . , 19) in the time domain.

Figure 3:
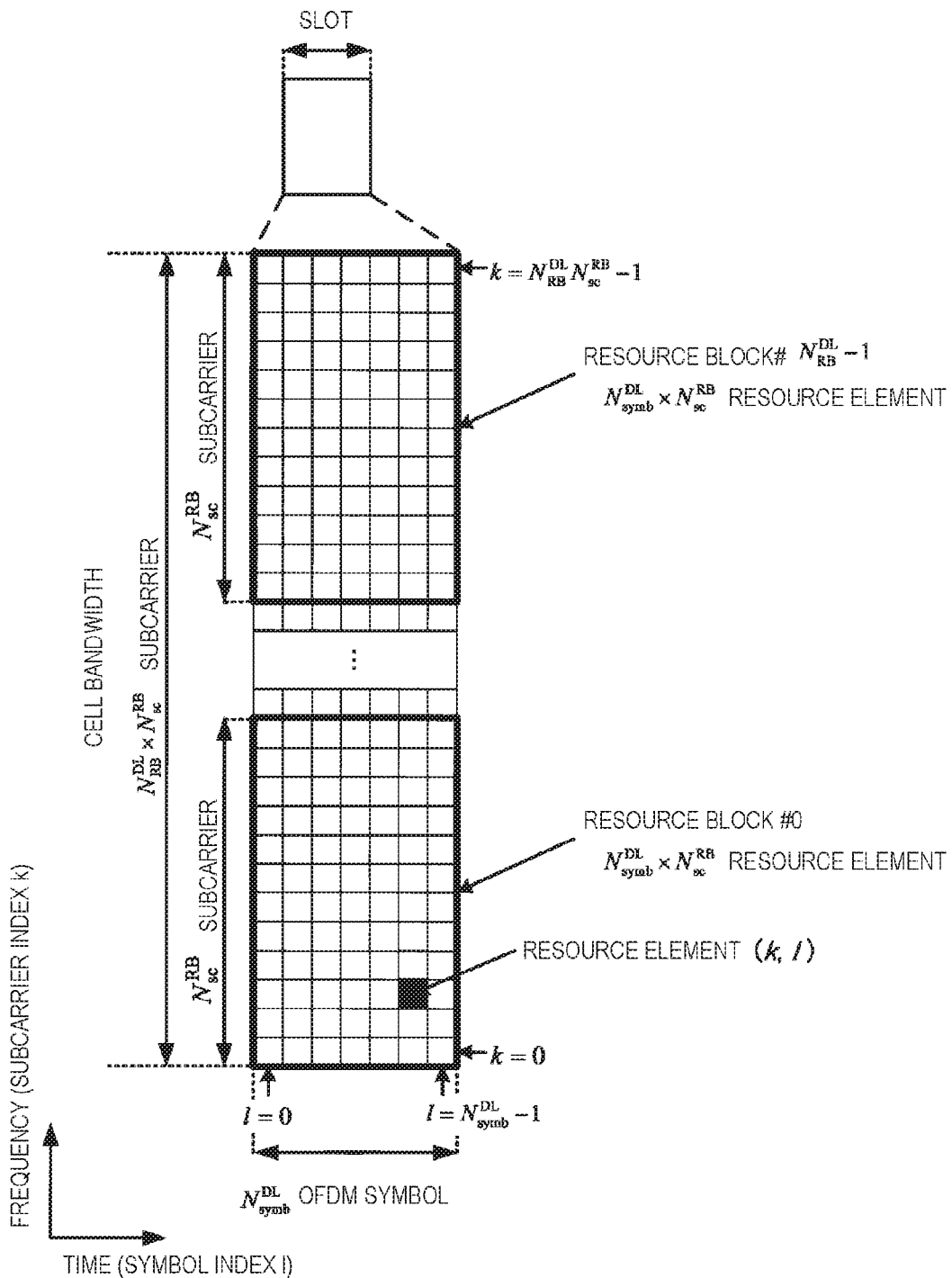
FIG. 3 is a diagram illustrating a schematic configuration of a downlink slot according to the present embodiment.

A constitution of a slot according to the present embodiment will be described below. FIG. 3 is a diagram illustrating a schematic configuration of a downlink slot according to the present embodiment. FIG. 3 illustrates a constitution of a downlink slot in one cell. In FIG. 3, the horizontal axis is a time axis, and the vertical axis is a frequency axis. In FIG. 3, l is an orthogonal frequency-division multiplexing (OFDM) symbol number/index, and k is a subcarrier number/index.

The physical signal or the physical channel transmitted in each of the slots is expressed by a resource grid. In the downlink, the resource grid is defined by multiple subcarriers and multiple OFDM symbols. Each element within the resource grid is referred to as a resource element. The resource element is expressed by a subcarrier number/index k and an OFDM symbol number/index l.

The resource grid is defined for each antenna port. In the present embodiment, description is given for one antenna port. The present embodiment may be applied to each of multiple antenna ports.

The downlink slot includes multiple OFDM symbols l (l=0, 1, . . . , and NDLsymb) in the time domain. NDLsymb indicates the number of OFDM symbols included in one downlink slot. For a normal Cyclic Prefix (CP), NDLsymb is 7. For an extended Cyclic Prefix (CP), NDLsymb is 6.

The downlink slot includes multiple subcarriers k (k=0, 1, . . . , NDLRB×NRBsc) in a frequency domain. NDLRB is a downlink bandwidth configuration for a serving cell, which is expressed by a multiple of NRBsc. NRBsc is a (physical) resource block size in the frequency domain, which is expressed by the number of subcarriers. In the present embodiment, a subcarrier interval Δf is 15 kHz, and NRBsc is 12 subcarriers. That is, in the present embodiment, NRBsc is 180 kHz.

A resource block is used to express mapping of a physical channel to resource elements. For the resource block, a virtual resource block and a physical resource block are defined. The physical channel is first mapped to the virtual resource block. Thereafter, the virtual resource block is mapped to the physical resource block. One physical resource block is defined by NDLsymb contiguous OFDM symbols in the time domain and by NRBsc contiguous subcarriers in the frequency domain. Hence, one physical resource block is constituted by (NDLsymb×NRBsc) resource elements. One physical resource block corresponds to one slot in the time domain. The physical resource blocks are numbered/indexed (0, 1, . . . , NDLRB−1) in an order starting from a lower frequency in the frequency domain.

Physical channels and physical signals in the present embodiment will be described.

In FIG. 1, the following uplink physical channels are used for uplink radio communication from the terminal device 1 to the base station device 3. The uplink physical channels are used by a physical layer for transmission of information output from a higher layer.

Physical Uplink Control Channel (PUCCH)
Physical Uplink Shared Channel (PUSCH)
Physical Random Access Channel (PRACH)

The PUCCH is used for transmission of Uplink Control Information (UCI).

The PUSCH is used for transmission of uplink data (UpLink-Shared Channel (UL-SCH)) and/or Uplink Control Information.

The PRACH is used for transmission of a random access preamble (random access message 1).

In FIG. 1, the following uplink physical signal is used in the uplink radio communication. The uplink physical signal is not used for transmission of information output from the higher layer, but is used by the physical layer.

Uplink Reference Signal (UL RS)

In the present embodiment, the following two types of uplink reference signals are used.

Demodulation Reference Signal (DMRS)
Sounding Reference Signal (SRS)

In FIG. 1, the following downlink physical channels are used for downlink radio communication from the base station device 3 to the terminal device 1. The downlink physical channels are used by the physical layer for transmission of information output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB, Broadcast Channel (BCH)), that is shared by the terminal devices 1.

The PCFICH is used for transmission of information indicating a region (OFDM symbols) to be used for transmission of the PDCCH in a subframe, in which the PCFICH is transmitted.

The PHICH is used for transmission of a HARQ indicator indicating an Acknowledgement (ACK) or a Negative Acknowledgement (NACK) for the uplink data (Uplink Shared Channel (UL-SCH)) received by the base station device 3.

The PDCCH and the EPDCCH are used for transmission of Downlink Control Information (DCI). The Downlink Control Information is also referred to as a DCI format. The Downlink Control Information is mapped to a field of the DCI format. The Downlink Control Information includes a downlink grant and an uplink grant. The downlink grant is also referred to as downlink assignment or downlink allocation.

One downlink grant is used for scheduling of one PDSCH within one serving cell. The downlink grant is used for scheduling of the PDSCH within a subframe same as the subframe in which the downlink grant is transmitted.

One uplink grant is used for scheduling of one PUSCH within one serving cell. The uplink grant is used for scheduling of the PUSCH within the fourth or later subframe from the subframe in which the uplink grant is transmitted.

CRC parity bits attached to the downlink grant or the uplink grant are scrambled with a Cell-Radio Network Temporary Identifier (C-RNTI) or a Semi Persistent Scheduling (SPS) Cell-Radio Network Temporary Identifier (C-RNTI). The C-RNTI and the SPS C-RNTI are identifiers for identifying a terminal device within a cell. The C-RNTI is used to control the PDSCH or the PUSCH in one subframe. The SPS C-RNTI is used to periodically allocate a resource for the PDSCH or the PUSCH.

The PDSCH is used for transmission of downlink data (Downlink Shared Channel (DL-SCH)).

The PMCH is used for transmission of multicast data (Multicast Channel (MCH)).

In FIG. 1, the following downlink physical signals are used in the downlink radio communication. The downlink physical signals are not used for transmission of information output from the higher layer, but are used by the physical layer.

Synchronization signal (SS)
  Downlink Reference Signal (DL RS)

The Synchronization signal is used in order for the terminal device 1 to be synchronized to frequency and time domains in the downlink.

The Downlink Reference Signal is used in order for the terminal device 1 to perform channel compensation on a downlink physical channel. The Downlink Reference Signal is used in order for the terminal device 1 to calculate downlink channel state information.

In the present embodiment, the following seven types of Downlink Reference Signals are used.

Cell-specific Reference Signal (CRS)
  UE-specific Reference Signal (URS) associated with the PDSCH
  Demodulation Reference Signal (DMRS) associated with the EPDCCH
  Non-Zero Power Chanel State Information-Reference Signal (NZP CSI-RS)
  Zero Power Chanel State Information-Reference Signal (ZP CSI-RS)
  Multimedia Broadcast and Multicast Service over Single Frequency Network Reference Signal (MBSFN RS)
  Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to coding processing on a codeword-by-codeword basis.

The base station device 3 and the terminal device 1 exchange (transmit and/or receive) a signal in the higher layer. For example, the base station device 3 and the terminal device 1 may transmit and/or receive, in a Radio Resource Control (RRC) layer, RRC signaling (also referred to as a Radio Resource Control message (RRC message) or Radio Resource Control information (RRC information)). Furthermore, the base station device 3 and the terminal device 1 may transmit and/or receive, in the Medium Access Control (MAC) layer, a MAC Control Element (CE). Here, the RRC signaling and/or the MAC CE is also referred to as higher layer signaling.

The PUSCH and the PDSCH are used for transmission of the RRC signaling and the MAC CE. Here, the RRC signaling transmitted from the base station device 3 on the PDSCH may be signaling common to multiple terminal devices 1 in a cell. The RRC signaling transmitted from the base station device 3 on the PDSCH may be signaling dedicated to a certain terminal device 1 (also referred to as dedicated signaling or UE specific signaling). A cell-specific parameter may be transmitted by using the signaling common to the multiple terminal devices 1 in the cell or the signaling dedicated to the certain terminal device 1. A UE-specific parameter may be transmitted by using the signaling dedicated to the certain terminal device 1.

The uplink grant includes a DCI format 0 and a DCI format 4. A PUSCH transmission scheme corresponding to the DCI format 0 is single antenna port. A PUSCH transmission scheme corresponding to the DCI format 4 is closed-loop spatial multiplexing.

The downlink grant includes a DCI format 1A and a DCI format 2. A PDSCH transmission scheme corresponding to the DCI format 1A is single antenna port or transmit diversity. A PDSCH transmission scheme corresponding to the DCI format 2 is closed-loop spatial multiplexing.

A PDCCH/EPDCCH including a DCI format used for scheduling a PDSCH/PUSCH in a certain serving cell is referred to as PDCCH/EPDCCH for the certain serving cell.

A DCI format used for scheduling a PDSCH/PUSCH in a certain serving cell is referred to as a DCI format for the certain serving cell. A payload size of the DCI format 0 for a certain serving cell is same as a payload size of the DCI format 1A for the same serving cell. The DCI format 0 and the DCI format 1A include a flag indicating a type of the DCI format (0 or 1A). The DCI format 0 and/or the DCI format 1A is also referred to as a DCI format 0/1A.

Apart from the DCI format 0/1A, a different DCI format for a certain serving cell has a different payload size. Apart from the DCI format 0/1A, the terminal device 1 can specify a DCI format, based on the payload size of the DCI format. Different DCI formats for different serving cells may have the same payload size. The terminal device 1 can specify the DCI format, based on a Carrier Indicator Field (CIF) value included in the DCI format. The CIF is a field to which a carrier indicator is mapped. The carrier indicator value indicates a serving cell to which the DCI format associated with the carrier indicator corresponds. The carrier indicator value is also referred to as a CIF value.

The PDCCH/EPDCCH for the primary cell is transmitted in the primary cell. The PDCCH/EPDCCH for the secondary cell is transmitted in the primary cell, the same secondary cell, or a different secondary cell.

Based on the detection of a PDCCH/EPDCCH including a CIF in a certain serving cell, the terminal device 1 decodes a PDSCH in a serving cell indicated by a CIF value included in the decoded PDCCH/EPDCCH.

The terminal device 1 that is configured to monitor, in another serving cell, the PDCCH/EPDCCH corresponding to the serving cell and including the CIF monitors the PDCCH/EPDCCH including the CIF in another serving cell. The terminal device 1 that is configured to monitor, in another serving cell, the PDCCH/EPDCCH corresponding to the serving cell and including the CIF may not monitor the PDCCH/EPDCCH in the serving cell.

The terminal device 1 that is not configured to monitor, in another serving cell, the PDCCH/EPDCCH corresponding to the serving cell and including the CIF monitors the PDCCH/EPDCCH in the serving cell.

The monitoring of the PDCCH/EPDCCH including the CIF implies attempting to decode the PDCCH or the EPDCCH in accordance with the DCI format including the CIF.

The base station device 3 transmits, to the terminal device 1, a parameter (cif-Presence-r10) indicating whether the CIF is included in the DCI format transmitted in the primary cell.

For each secondary cell, the base station device 3 transmits, to the terminal device 1, a parameter (CrossCarrierSchedulingConfig-r10) associated with cross carrier scheduling.

The parameter (CrossCarrierSchedulingConfig-r10) includes a parameter (schedulingCellInfo-r10) indicating whether the PDCCH/EPDCCH corresponding to an associated secondary cell is transmitted in the secondary cell or is transmitted in a different serving cell.

In a case where the parameter (schedulingCellInfo-r10) indicates that the PDCCH/EPDCCH corresponding to the associated secondary cell is transmitted in the secondary cell, the parameter (schedulingCellInfo-r10) includes the parameter (cif-Presence-r10) indicating whether the CIF is included in a DCI format transmitted in the secondary cell.

In a case where the parameter (schedulingCellInfo-r10) indicates that the PDCCH/EPDCCH corresponding to the associated secondary cell is transmitted in another serving cell, the parameter (schedulingCellInfo-r10) includes a parameter (schedulingCellId) indicating in which serving cell the DCI format for the associated secondary cell is sent.

In the case where the parameter (schedulingCellInfo-r10) indicates that the PDCCH/EPDCCH corresponding to the associated secondary cell is transmitted in another serving cell, the base station device 3 may transmit, to the terminal device 1, information indicating to which CIF value included in the PDCCH/EPDCCH in the another serving cell the secondary cell corresponds.

Figure 4:
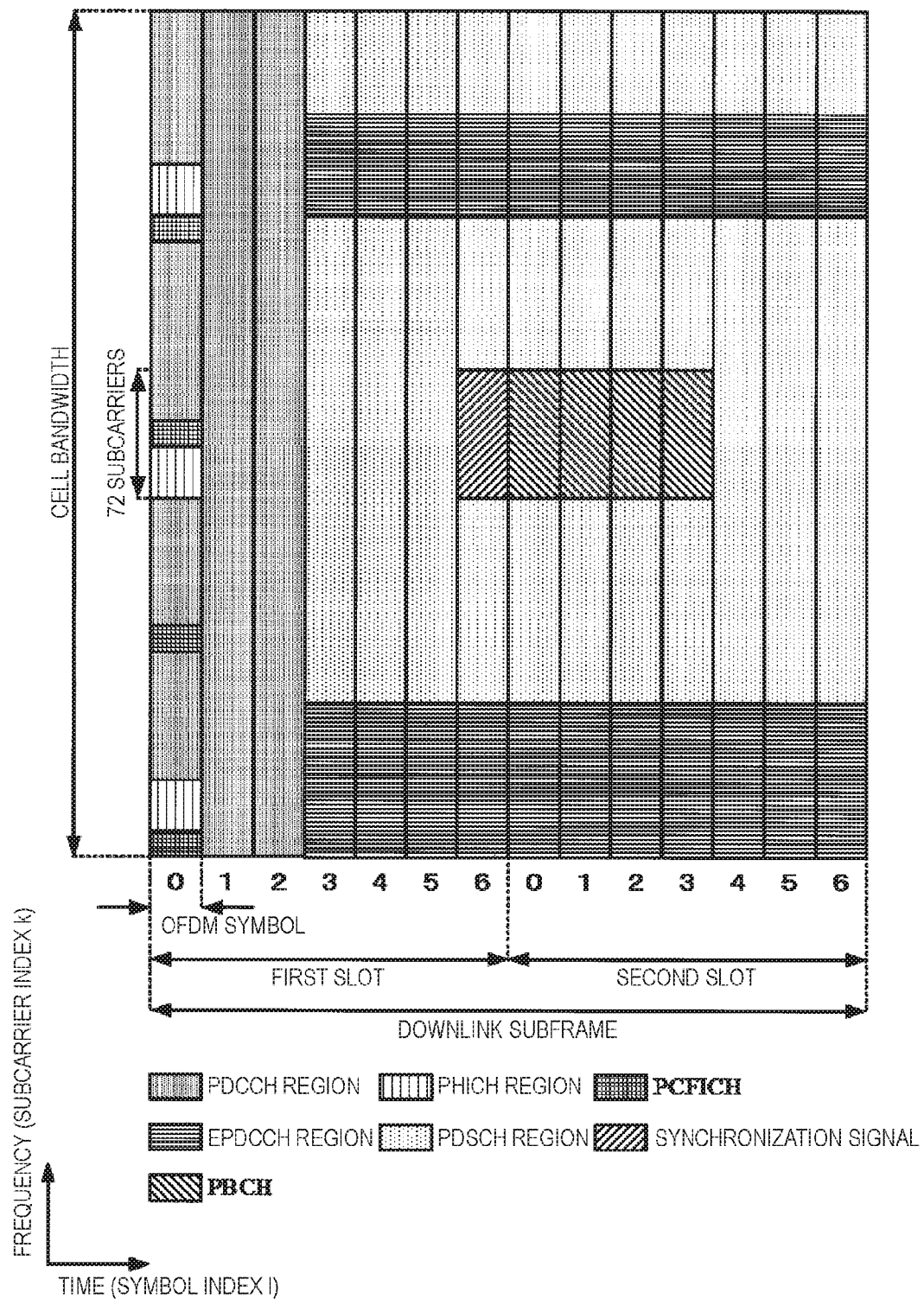
FIG. 4 is a diagram illustrating an example of downlink signal mapping according to the present embodiment.

FIG. 4 is a diagram illustrating an example of downlink signal mapping according to the present embodiment. A PDCCH region is indicated by a CFI included in the PCFICH. The PDCCH region includes multiple PDCCH candidates. One PDCCH is transmitted by using one PDCCH candidate.

An EPDCCH region includes multiple EPDCCH candidates. One EPDCCH is transmitted by using one EPDCCH candidate. The EPDCCH region is also referred to as an EPDCCH set or an EPDCCH-PRB set. The base station device 3 transmits, to the terminal device 1, information indicating a frequency band constituting the EPDCCH set. The frequency band constituting the EPDCCH set is expressed by a PRB index. The PRB index, to which one EPDCCH set corresponds, may be non-contiguous. In one subframe of one serving cell, two EPDCCH sets may be configured.

Figure 5:
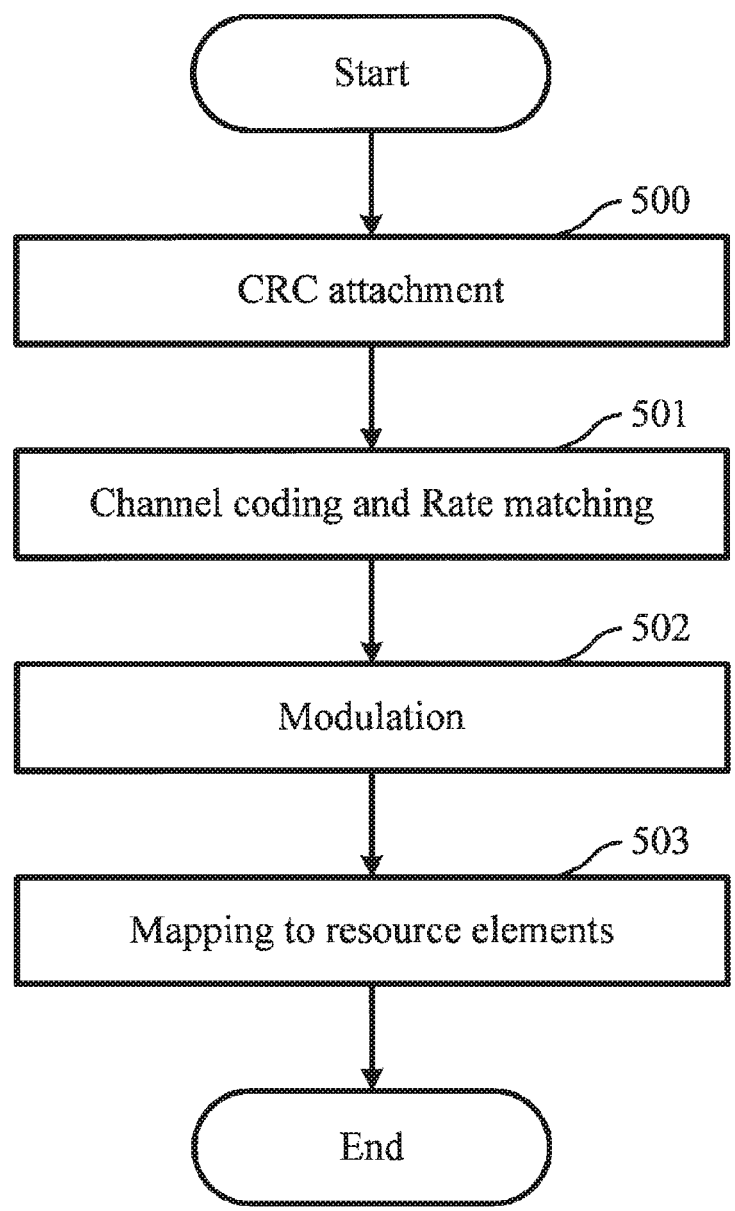
FIG. 5 is a diagram illustrating an example of a transmission process of Downlink Control Information according to the present embodiment.

FIG. 5 is a diagram illustrating an example of a transmission process of Downlink Control Information according to the present embodiment. (500) The base station device 3 derives CRC parity bits, based on Downlink Control Information (DCI format), and attaches CRC parity bits scrambled with the RNTI to the Downlink Control Information. (501) The base station device 3 performs channel coding on the Downlink Control Information, to which the CRC parity bits scrambled with the RNTI are attached.

(502) The base station device 3 performs QPSK modulation on the Downlink Control Information, which has been subjected to channel coding. (503) The base station device 3 maps a modulation symbol of the Downlink Control Information to a resource element (the PDCCH candidate or the EPDCCH candidate).

The terminal device 1 monitors a set of PDCCH candidates and/or all sets of EPDCCH candidates in one subframe of the serving cell. The terminal device 1 may not monitor all PDCCH candidates and all EPDCCH candidates in one subframe of the serving cell. The monitoring implies attempting to decode each of the PDCCHs/EPDCCHs in the set of PDCCH candidates/set of EPDCCH candidates according to a monitored DCI format.

The base station device 3 selects, from the set of PDCCH candidates and/or all sets of EPDCCH candidates monitored by the terminal device 1 in one subframe of the serving cell, a PDCCH candidate/EPDCCH candidate to be used for PDCCH transmission to the terminal device 1.

The set of PDCCH candidates to be monitored and the set of EPDCCH candidates to be monitored are also referred to as a search space. Multiple search spaces include multiple Common Search Spaces (CSSs) and multiple User equipment-specific Search Spaces (USSs). The multiple CSSs include multiple PDCCH CSSs. The multiple USSs include multiple PDCCH USSs and multiple EPDCCH USSs. One PDCCH USS is one set constituted by multiple PDCCH candidates. One EPDCCH USS is one set constituted by multiple EPDCCH candidates.

The PDCCH candidates included in the same PDCCH CSS are constituted by the same number of Control Channel Elements (CCEs). The PDCCH candidates included in the same PDCCH USS are constituted by the same number of CCEs. The EPDCCH candidates included in the same EPDCCH USS are constituted by the same number of Enhanced Control Channel Elements (ECCEs). The number of CCEs constituting a PDCCH candidate and the number of ECCEs constituting an EPDCCH candidate are referred to as an aggregation level L. The CCE is constituted by multiple resource elements included in the PDCCH region. The ECCE is constituted by multiple resource elements included in the EPDCCH set. The PDCCH USS and the EPDCCH USS are defined for each aggregation level.

For each of the serving cells in which the PDCCH is monitored, one or multiple CCEs corresponding to (a) PDCCH candidate(s) m included in a PDCCH USS $S_k^{(L)}$ corresponding to an aggregation level L in a subframe k is given by Expression (9), Expression (10), and Expression (11).

$$L\{(Y_k+m') \bmod \operatorname{floor}(N_{CCE,k}/L)\}+i \quad \text{[Expression 9]}$$

where i=0, 1, . . . , L−1

$$m'=m+M^{(L)} \cdot n_{CI} \quad \text{[Expression 10]}$$

where m=0, 1, . . . , $M_c^{(L)}$−1

$$Y_k=(A \cdot Y_{k-1}) \bmod D \quad \text{[Expression 11]}$$

where $Y_{-1}=n_{RNTI} \neq 0$, A=39827, D=65537, k=floor($n_s$/2)

X mod Y is a function returning a remainder obtained by dividing X by Y. floor is a function returning a value obtained by truncating an input value after the decimal point. $N_{CCE,k}$ is a total number of CCEs included in the subframe k. m is an index of PDCCH candidates included in the PDCCH USS $S_k^{(L)}$. $M^{(L)}$ is the number of PDCCH candidates monitored in the PDCCH USS $S_k^{(L)}$. nCI is a CIF value. The PDCCH USS $S_k^{(L)}$ is defined for each CIF value. The terminal device 1 monitors a PDCCH USS $S_k^{(L)}$ corresponding to a value to which the CIF included in the DCI format to be monitored can be set. nRNTI is an RNTI value. In the present embodiment, nRNTI is a C-RNTI value.

$M^{(L)}$ may be a value decided in advance for each aggregation level L. For example, for L=2, $M^{(L)}$ may be 6.

Figure 6:
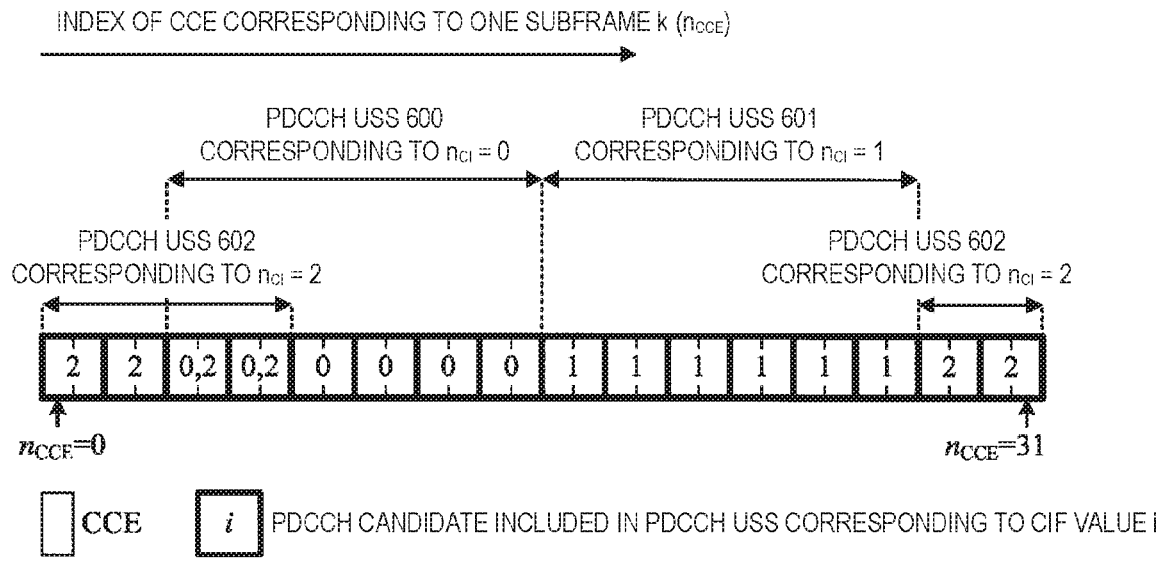
FIG. 6 is a diagram illustrating an example of PDCCH USSs in one subframe k of one serving cell according to the present embodiment.

FIG. 6 is a diagram illustrating an example of PDCCH USSs in one subframe k of one serving cell according to the present embodiment. The PDCCH USSs in FIG. 6 are given by Expressions (9) and (10). In FIG. 6, the horizontal axis gives an index nCCE of CCEs included in one subframe k of one serving cell. FIG. 6 includes a PDCCH USS 600 corresponding to a CIF value 0, a PDCCH USS 601 corresponding to a CIF value 1, and a PDCCH USS 602 corresponding to a CIF value 2. Bold squares with i are PDCCH candidates included in a PDCCH USS corresponding to a CIF value i. In FIG. 6, bold squares with 0 and 2 are PDCCH candidates included in both the PDCCH USS 600 and the PDCCH USS 602. In FIG. 6, NCCE,k is 32, L is 2, and Yk is 2. In FIG. 6, M(L) is 6 for each of the PDCCH USSs 600, 601, and 602.

In FIG. 6, a PDCCH candidate m=M(L)−1 included in a PDCCH USS corresponding to a certain CIF value is adjacent to a PDCCH candidate m=0 included in a PDCCH USS corresponding to a CIF value that is greater by one than the certain CIF value. That is, a PDCCH USS corresponding to a certain CIF value is adjacent to a PDCCH USS corresponding to a CIF value that is greater by one than the certain CIF value.

The number $M^{(L)}$ of PDCCH candidates included in the PDCCH USS monitored by the terminal device 1 may be reduced based on a coefficient αc. The number $M_c^{(L)}$ of PDCCH candidates reduced based on the coefficient $\alpha_c$ may be given by Expression (12). c is a CIF value. Reducing the number of PDCCH candidates can reduce a load of a reception process by the terminal device 1.

$$M_c^{(L)}=\operatorname{ceiling}(\alpha_c \cdot M^{(L)}) \quad \text{[Expression 12]}$$

where αc∈{0, 0.33, 0.66, 1}

$$m'=m+M^{(L)} \cdot n_{CI} \quad \text{[Expression 13]}$$

where m=0, 1, . . . , $M_c^{(L)}$−1 ceiling is a function returning a value obtained by rounding up an input value to the whole number. The coefficient $\alpha_c$ may be defined for each aggregation level. The coefficient $\alpha_c$ may be defined for each scheduled serving cell. The $\alpha_c$ may be defined for each CIF value, to which the coefficient $\alpha_c$ may be defined for each CIF value, to which the PDCCH USS corresponds. The base station device 3 may transmit information/a parameter indicating the coefficient $\alpha_c$ to the terminal device 1.

Figure 7:
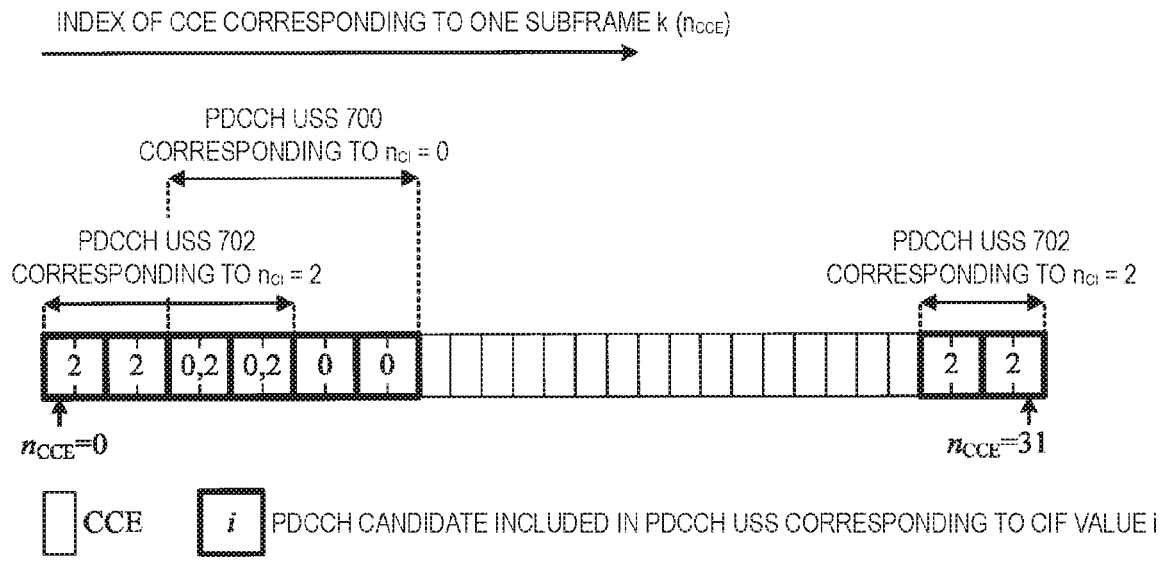
FIG. 7 is a diagram illustrating an example of PDCCH USSs in one subframe k of one serving cell according to the present embodiment.

FIG. 7 is a diagram illustrating an example of PDCCH USSs in one subframe k of one serving cell according to the present embodiment. The PDCCH USSs in FIG. 7 are given by Expressions (9), (12), and (13). In FIG. 7, the horizontal axis gives an index nCCE of CCEs included in one subframe k of one serving cell. FIG. 7 includes a PDCCH USS 700 corresponding to a CIF value 0 and a PDCCH USS 702 corresponding to a CIF value 2. Bold squares with i are PDCCH candidates included in a PDCCH USS corresponding to a CIF value i. In FIG. 7, bold squares with 0 and 2 are PDCCH candidates included in both the PDCCH USS 700 and the PDCCH USS 702. In FIG. 7, NCCE,k is 32, L is 2, and Yk is 2. For the PDCCH USS 700, α0 is 0.66 and M0(L) is 4. For the PDCCH USS 701, α1 is 0 and M1(L) is 0. For the PDCCH USS 702, α2 is 1 and M2(L) is 6.

In FIG. 7, a CCE, to which a PDCCH candidate m=0 included in a PDCCH USS corresponding to a certain CIF value corresponds, does not depend on a value of the coefficient αc. As a result, a process for monitoring by the terminal device 1 can be simplified.

In FIG. 7, PDCCH candidates monitored by the terminal device 1 are reduced; however, PDCCH candidates included in multiple PDCCH USSs still exist. Due to the PDCCH candidates included in the multiple PDCCH USSs, scheduling of the PDCCH by the base station device 3 is limited.

Expression (14) may be used instead of Expression (13). In Expression (14), Mc(L) corresponding to a value with no possibility of a CIF included in a DCI format to be monitored in a serving cell including the PDCCH USS is 0, and M−1(L) is 0.

$$m' = m_{n_{CI}} + \sum_{x=-1}^{n_{CI}-1} M_x^{(L)} \quad \text{[Expression 14]}$$

where $m_{n_{CI}} = 0, 1, \ldots , M_{n_{CI}}^{(L)} - 1, M_{-1}^{(L)} = 0$

Figure 8:
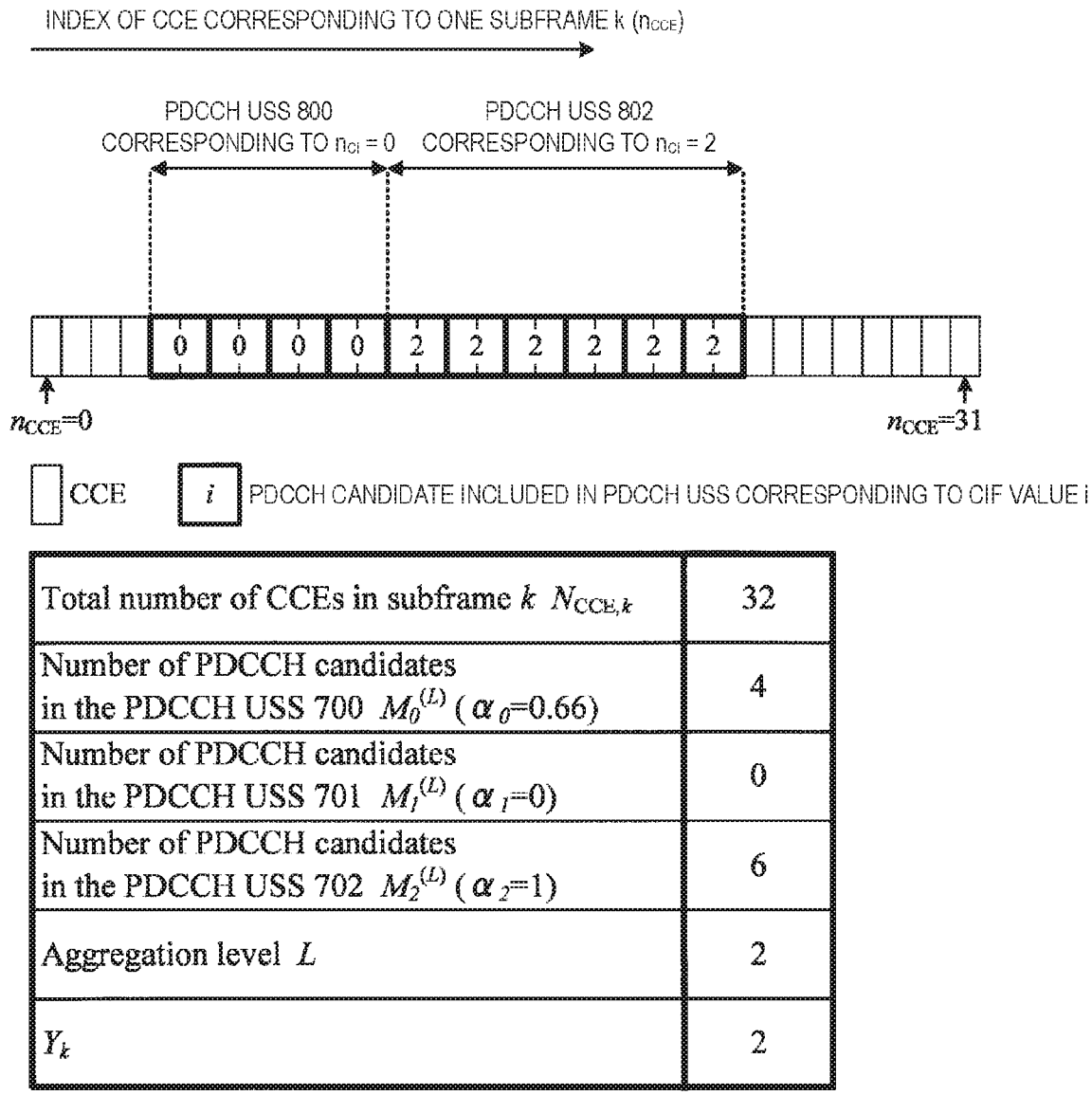
FIG. 8 is a diagram illustrating an example of PDCCH USSs in one subframe k of one serving cell according to the present embodiment.

FIG. 8 is a diagram illustrating an example of PDCCH USSs in one subframe k of one serving cell according to the present embodiment. The PDCCH USSs in FIG. 8 are given by Expressions (9), (12), and (14). In FIG. 8, the horizontal axis gives an index nCCE of CCEs included in one subframe k of one serving cell. FIG. 8 includes a PDCCH USS 800 corresponding to a CIF value 0 and a PDCCH USS 802 corresponding to a CIF value 2. Bold squares with i are PDCCH candidates included in a PDCCH USS corresponding to a CIF value i. In FIG. 8, NCCE,k is 32, L is 2, and Yk is 2. For the PDCCH USS 800, α0 is 0.66 and M0(L) is 4. For the PDCCH USS 801, α1 is 0 and M1(L) is 0. For the PDCCH USS 802, α2 is 1 and M2(L) is 6.

In FIG. 8, a CCE to, which a PDCCH candidate m=0 included in a PDCCH USS corresponding to a certain CIF value corresponds, is given based on a value of the coefficient $\alpha_c$ and an $M_c^{(L)}$ value. This can reduce the probability that a certain PDCCH candidate is simultaneously included in multiple PDCCH USSs.

In a case where the terminal device 1 is not configured to monitor the PDCCH including the CIF in the serving cell, a value of m' in Expressions (10), (13), and (14) may be 0.

For a serving cell in which the EPDCCH is monitored, one or multiple ECCEs corresponding to (an) EPDCCH candidate(s) m included in an EPDCCH USS ESk(L) corresponding to an aggregation level L in an EPDCCH set p in a subframe k is given by Expression (15) and Expression (16).

$$L\left\{\left(Y_{p,k} + \text{floor}\left(\frac{m_p \cdot N_{ECCE,p,k}}{L \cdot M_p^{(L)}}\right) + b\right) \text{mod} \text{floor}(N_{CCE,p,k}/L)\right\} + i \quad \text{[Expression 15]}$$

where
$i = 0, 1, \ldots, L-1, m_p = 0, 1, \ldots, M_p^{(L)} - 1$ $$Y_{p,k} = (A_p \cdot Y_{p,k-1}) \text{mod} D \quad \text{[Expression 16]}$$

where
$Y_{p,-1} = n_{RNTI} \neq 0, A_0 = 39827, A_1 = 39829,$
$D = 65537, k = \text{floor}(n_s/2)$ NECCE,p,k is a total number of ECCEs included in the EPDCCH set p in subframe k. mp is an index of the EPDCCH candidates included in the EPDCCH USS ESk(L). b is a CIF value. Mp(L) is the number of EPDCCH candidates monitored in the EPDCCH USS ESk(L). The EPDCCH USS ESk(L) is defined for each CIF value. The terminal device 1 monitors an EPDCCH USS Sk(L) corresponding to a value to which a CIF included in the DCI format to be monitored can be set. nRNTI is a value of the RNTI. In the present embodiment, nRNTI is a value of the C-RNTI.

Mp(L) may be given based on the aggregation level L, the number of PRBs included in the EPDCCH set, the number of EPDCCH sets configured in one subframe in the serving cell, and the like. In FIG. 9 to FIG. 12, Mp(L) is 6. It is noted that in FIG. 10 to FIG. 12, the number of EPDCCH candidates actually monitored in the EPDCCH USS ESk(L) is subtracted from Mp(L).

Figure 9:
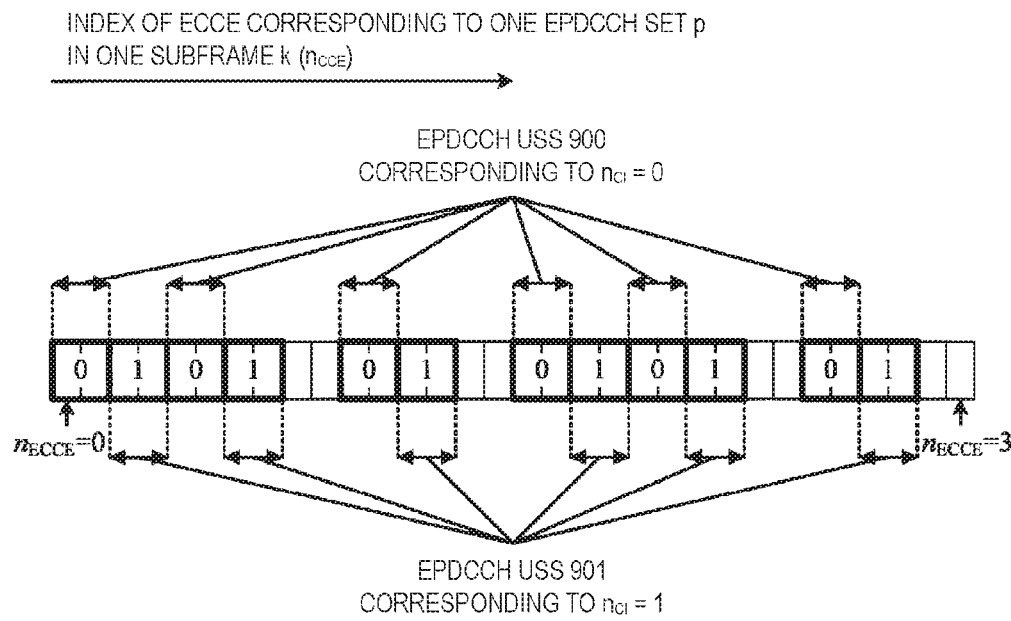
FIG. 9 is a diagram illustrating an example of EPDCCH USSs in one EPDCCH set p in one subframe k of one serving cell according to the present embodiment.

FIG. 9 is a diagram illustrating an example of EPDCCH USSs in one EPDCCH set p in one subframe k of one serving cell according to the present embodiment. The EPDCCH USSs in FIG. 9 are given by Expression (15). In FIG. 9, the horizontal axis gives an index nECCE of ECCEs included in one EPDCCH set p in one subframe k of one serving cell. FIG. 6 includes an EPDCCH USS 900 corresponding to a CIF value 0 and an EPDCCH USS 901 corresponding to a CIF value 1. Bold squares with i are EPDCCH candidates included in an EPDCCH USS corresponding to a CIF value i. In FIG. 9, NECCE,p,k is 32, L is 2, and Yp,k is 0. In FIG. 9, Mp(L) is 6 for each of the EPDCCH USSs 900 and 901.

In FIG. 9, an EPDCCH candidate mp=x included in an EPDCCH USS corresponding to a certain CIF value is adjacent to an EPDCCH candidate mp=x included in an EPDCCH USS corresponding to a CIF value that is greater by one than the certain CIF value.

The number Mp(L) of EPDCCH candidates included in the EPDCCH USS monitored by the terminal device 1 may be reduced based on a coefficient αp,c. The number Mp,c(L) of EPDCCH candidates reduced based on the coefficient αp,c may be given by Expression (17). c is a CIF value. By reducing the number of EPDCCH candidates, the load of the reception process by the terminal device 1 can be reduced.

$$M_{p,c}^{(L)} = \text{ceiling}(\alpha_{p,c} \cdot M_p^{(L)}) \quad \text{[Expression 17]}$$

where $\alpha_{p,c} \in \{0, 0.33, 0.33, 1\}$

The coefficient αp,c may be defined for each aggregation level and for each EPDCCH set. The coefficient αp,c may be defined for each scheduled serving cell. The coefficient αp,c may be defined for each CIF value, to which the EPDCCH USS corresponds. The base station device 3 may transmit information/a parameter indicating the coefficient αp,c to the terminal device 1.

The terminal device 1 may use Mp,c(L) instead of Mp(L) in Expression (15). Expression (18) is obtained by replacing Mp(L) in Expression (15) with Mp,c(L).

$$L\left\{\left(Y_{p,k} + \text{floor}\left(\frac{m_p \cdot N_{ECCE,p,k}}{L \cdot M_{p,c}^{(L)}}\right) + b\right) \text{mod} \text{floor}(N_{CCE,p,k}/L)\right\} + i \quad \text{[Expression 18]}$$

where
$i = 0, 1, \ldots, L-1, m_p = 0, 1, \ldots, M_{p,c}^{(L)} - 1$

Figure 10:
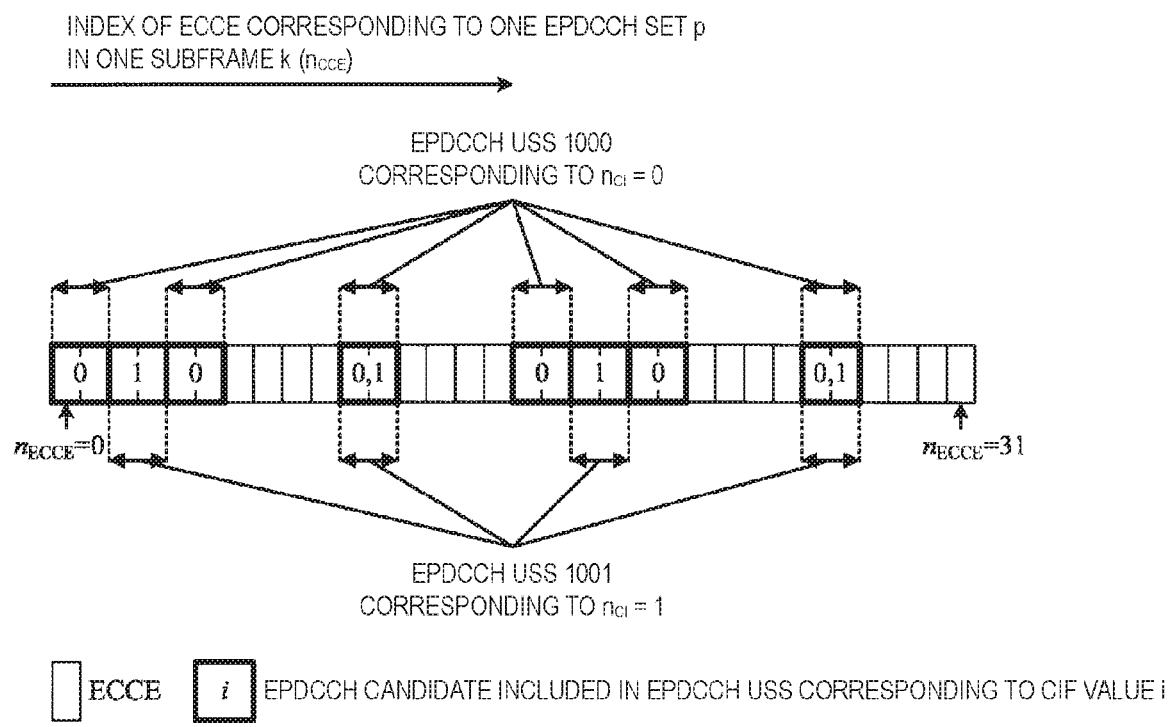
FIG. 10 is a diagram illustrating an example of EPDCCH USSs in one EPDCCH set p in one subframe k of one serving cell according to the present embodiment.

FIG. 10 is a diagram illustrating an example of EPDCCH USSs in one EPDCCH set p in one subframe k of one serving cell according to the present embodiment. The EPDCCH USSs in FIG. 10 are given by Expression (18). In FIG. 10, the horizontal axis gives an index nECCE of ECCEs included in one EPDCCH set p in one subframe k of one serving cell. FIG. 10 includes an EPDCCH USS 1000 corresponding to a CIF value 0 and an EPDCCH USS 1001 corresponding to a CIF value 1. Bold squares with i are EPDCCH candidates included in the EPDCCH USS corresponding to a CIF value i. In FIG. 10, bold squares with 0 and 1 are EPDCCH candidates included in both the EPDCCH USS 1000 and the EPDCCH USS 1002. In FIG. 10, NECCE,k is 32, L is 2, and Yp,k is 0. For the EPDCCH USS 1000, αp,0 is 1 and Mp,0(L) is 6. For the EPDCCH USS 1001, αp,1 is 0.66 and Mp,1(L) is 4.

In FIG. 10, an ECCE, to which an EPDCCH candidate mp=0 included in an EPDCCH USS corresponding to a certain CIF value corresponds, does not depend on a value of the coefficient αp,c. In FIG. 10, an ECCE, to which an EPDCCH candidate mp≠0 included in an EPDCCH USS corresponding to a certain CIF value corresponds, depends on the value of the coefficient αp,c.

In FIG. 10, PDCCH candidates monitored by the terminal device 1 are reduced; however, the possibility of an existence of EPDCCH candidates included in multiple EPDCCH USSs increases. Due to the EPDCCH candidates included in the multiple EPDCCH USSs, scheduling of the EPDCCH by the base station device 3 is limited.

The terminal device 1 may not use Mp,c(L) instead of Mp(L), even in a case that Mp(L) is reduced by αp,c. Expression (19) is obtained by changing the value of mp in Expression (15) from 0 to Mp,c(L). However, Mp(L) input in the floor function of Expression (19) is not changed to Mp,c(L).

$$L\left\{\left(Y_{p,k} + \text{floor}\left(\frac{m_p \cdot N_{ECCE,p,k}}{L \cdot M_p^{(L)}}\right) + b\right) \text{mod} \text{floor}(N_{CCE,p,k}/L)\right\} + i \quad \text{[Expression 19]}$$

where
$i = 0, 1, \ldots, L-1, m_p = 0, 1, \ldots, M_{p,c}^{(L)} - 1$

Figure 11:
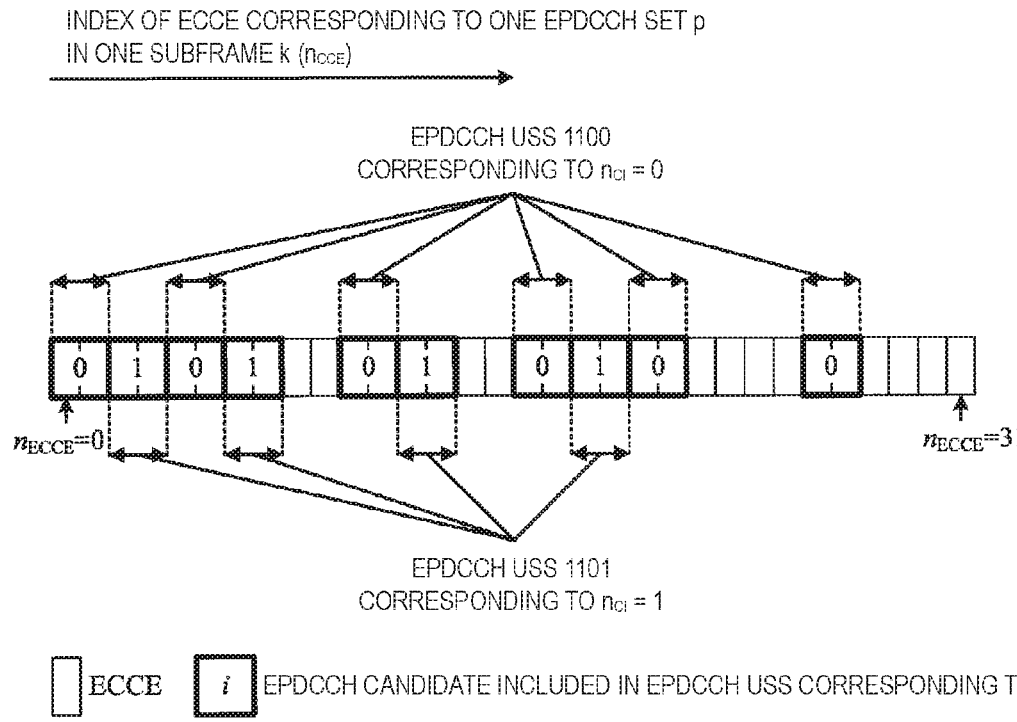
FIG. 11 is a diagram illustrating an example of EPDCCH USSs in one EPDCCH set p in one subframe k of one serving cell according to the present embodiment.

FIG. 11 is a diagram illustrating an example of EPDCCH USSs in one EPDCCH set p in one subframe k of one serving cell according to the present embodiment. The EPDCCH USSs in FIG. 11 are given by Expression (19). In FIG. 11, the horizontal axis gives an index nECCE of ECCEs included in one EPDCCH set p in one subframe k of one serving cell. FIG. 11 includes an EPDCCH USS 1100 corresponding to a CIF value 0 and an EPDCCH USS 1101 corresponding to a CIF value 1. Bold squares with i are EPDCCH candidates included in the EPDCCH USS corresponding to a CIF value i. In FIG. 11, NECCE,k is 32, L is 2, and Yp,k is 0. For the EPDCCH USS 1100, αp,0 is 1 and Mp,0(L) is 6. For the EPDCCH USS 1101, αp,1 is 0.66 and Mp,1(L) is 4.

In FIG. 11, an ECCE, to which a PDCCH candidate mp=x included in an EPDCCH USS corresponding to a certain CIF value corresponds, does not depend on the value of the coefficient αp,c. In FIG. 11, an EPDCCH candidate mp=x included in an EPDCCH USS corresponding to a certain CIF value is adjacent to an EPDCCH candidate mp=x included in an EPDCCH USS corresponding to a CIF value that is greater by one than the certain CIF value.

The EPDCCH USS 1101 in FIG. 11 is obtained by reducing a part of the EPDCCH candidates included in the EPDCCH USS 1001 in FIG. 10. When reducing the EPDCCH USS 1001 in FIG. 10, the EPDCCH candidates are reduced starting from the one having a larger index. As a result, the index of ECCEs corresponding to multiple EPDCCH candidates included in the EPDCCH USS 1101 in FIG. 11 becomes biased, and thus, frequency selection diversity effect from frequency-selective scheduling of the EPDCCH is limited.

Thus, mp in Expression (19) may be replaced with m'p. Expression (20) is obtained by replacing mp in Expression (19) with m'p. The values of mp in Expression (19) are values continuous from 0 to Mp,c(L), while m'p in Expression (20) represents non-consecutive values starting from 0 and not exceeding Mp,c(L)−1. The values of m'p are based on αp,c or Mp,c(L) calculated from αp,c. For example, m'p is given by Expression (21) or Expression (22).

$$L\left\{\left(Y_{p,k} + \text{floor}\left(\frac{m'_p \cdot N_{ECCE,p,k}}{L \cdot M_p^{(L)}}\right) + b\right) \mod \text{floor}(N_{CCE,p,k}/L)\right\} + i \quad \text{[Expression 20]}$$

where
$i = 0, 1, \ldots, L-1$ $$m'_p = \text{floor}\left(\frac{M^{(L)} \cdot m_{p,c}}{M_{p,c}^{(L)}}\right) \quad \text{[Expression 21]}$$

where $m_{p,c} = 0, 1, \ldots, M_{p,c}^{(L)} - 1$ $$m'_p = \text{floor}\left(\frac{m_{p,c}}{\alpha_{p,c}}\right) \quad \text{[Expression 22]}$$

where $m_{p,c} = 0, 1, \ldots, M_{p,c}^{(L)} - 1$

Figure 12:
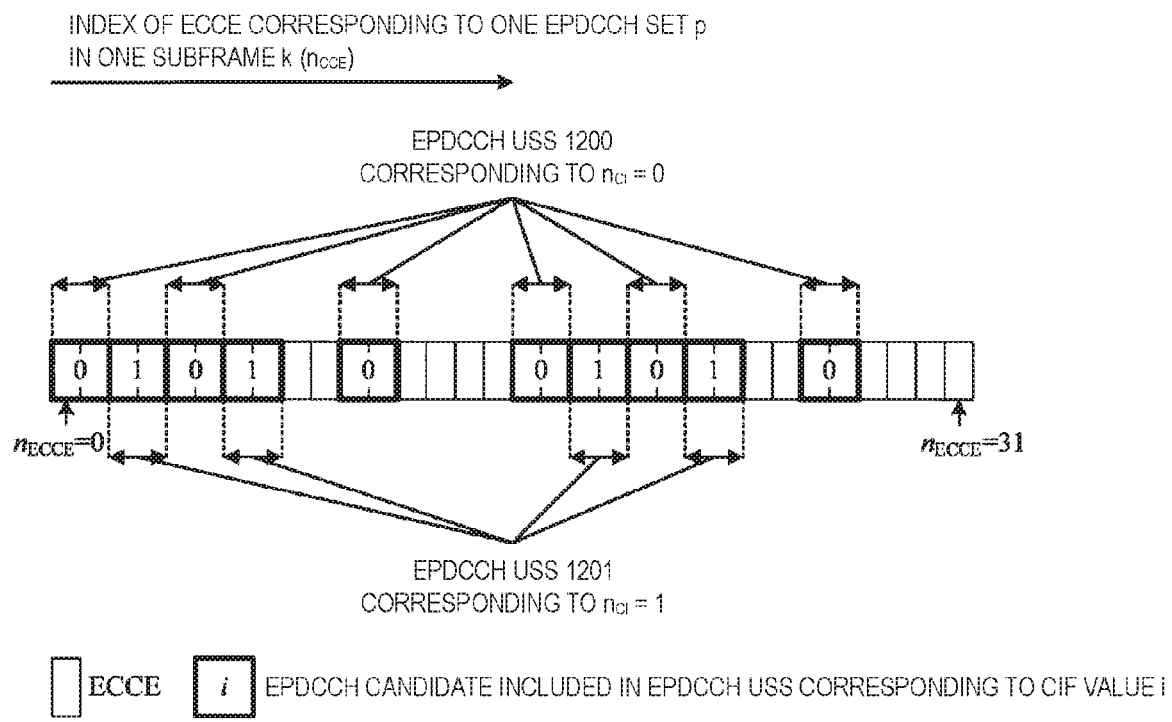
FIG. 12 is a diagram illustrating an example of EPDCCH USSs in one EPDCCH set p in one subframe k of one serving cell according to the present embodiment.

FIG. 12 is a diagram illustrating an example of EPDCCH USSs in one EPDCCH set p in one subframe k of one serving cell according to the present embodiment. The EPDCCH USSs in FIG. 12 are given by Expression (20) and Expression (22). In FIG. 12, the horizontal axis gives an index nECCE of ECCEs included in one EPDCCH set p in one subframe k of one serving cell. FIG. 12 includes an EPDCCH USS 1200 corresponding to a CIF value 0 and an EPDCCH USS 1201 corresponding to a CIF value 1. Bold squares with i are EPDCCH candidates included in the EPDCCH USS corresponding to a CIF value i. In FIG. 12, NECCE,k is 32, L is 2, and Yp,k is 0. For the EPDCCH USS 1200, αp,0 is 1 and Mp,0(L) is 6. For the EPDCCH USS 1201, αp,1 is 0.66 and Mp,1(L) is 4.

The EPDCCH USS 1201 in FIG. 12 is obtained by reducing a part of the EPDCCH candidates included in the EPDCCH USS 1001 in FIG. 10. When reducing the EPDCCH USS 1001 in FIG. 10, the index mp of the EPDCCH candidates is discontinuously reduced. As a result, the index of ECCEs corresponding to multiple EPDCCH candidates included in the EPDCCH USS 1201 in FIG. 12 does not become biased, and thus, the frequency selection diversity effect from the frequency-selective scheduling of the EPDCCH can be easily obtained.

In a case that the terminal device 1 is not configured to monitor the EPDCCH including the CIF in the serving cell, a value of b in Expressions (15), (18), (19), and (20) may be 0.

A correspondence between a DCI format and a USS according to the present embodiment will be described below.

A PDCCH used for transmitting a DCI format including a certain CIF value may be transmitted in a USS corresponding to the certain CIF value. In a case that different DCI formats have the same payload size, the PDCCH may be transmitted in any of different USSs corresponding to each of different CIF values included in the different DCI formats. The case that different DCI formats have the same payload size is the case that the same payload size correspond to multiple CIF values. In the case that different DCI formats have the same payload size, the load of the reception process of the terminal device 1 increases only slightly, even in a case that the different DCI formats having different CIF values share the USS.

A DCI format including a CIF value corresponding to a certain serving cell is referred to as a DCI format for a certain serving cell. The base station device 3 may transmit, to the terminal device 1, information/a parameter for instructing deactivation of monitoring of a DCI format 0/1A for a certain serving cell.

In a case that the monitoring of the DCI format 0/1A for a certain serving cell is deactivated, the terminal device 1 does not monitor the DCI format 0/1A for the certain serving cell in a USS based on a CIF value, to which the certain serving cell corresponds.

In the case that the monitoring of the DCI format 0/1A for a certain serving cell is deactivated, the terminal device 1 monitors the DCI format 0/1A for the certain serving cell in the USS based on the CIF value, to which the certain serving cell corresponds.

Regardless of whether the monitoring of the DCI format 0/1A for a certain serving cell is deactivated, the terminal device 1 monitors a DCI format Y for the certain serving cell in the USS based on the CIF value, to which the certain serving cell corresponds. Here, the DCI format Y is a DCI format other than the DCI format 0/1A.

Figure 13:
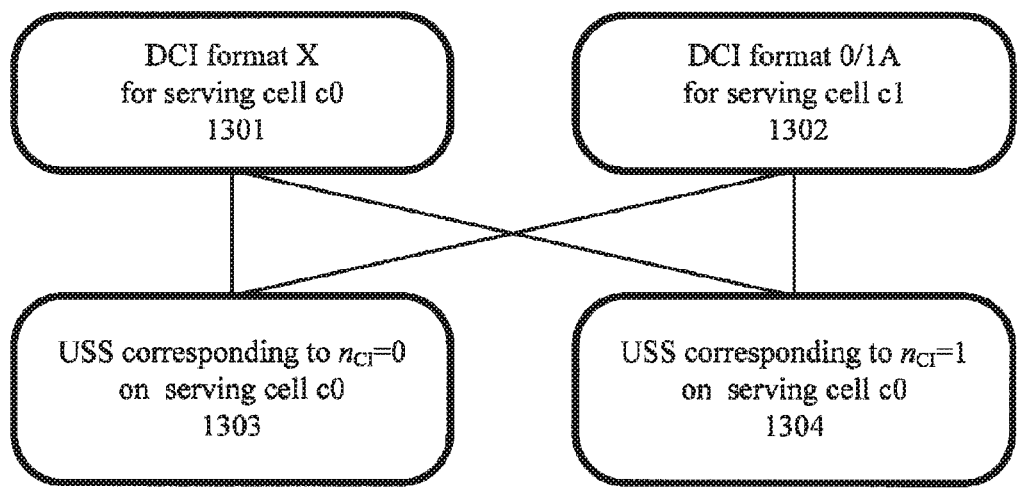
FIG. 13 is a diagram illustrating a correspondence between a DCI format and a USS in a case that monitoring of a DCI format 0/1A for a serving cell c1 corresponding to a CIF value 1 is not deactivated, according to the present embodiment.

FIG. 13 is a diagram illustrating a correspondence between a DCI format and a USS in a case that monitoring of a DCI format 0/1A for a serving cell c1 corresponding to a CIF value 1 is not deactivated, according to the present embodiment.

Figure 14:
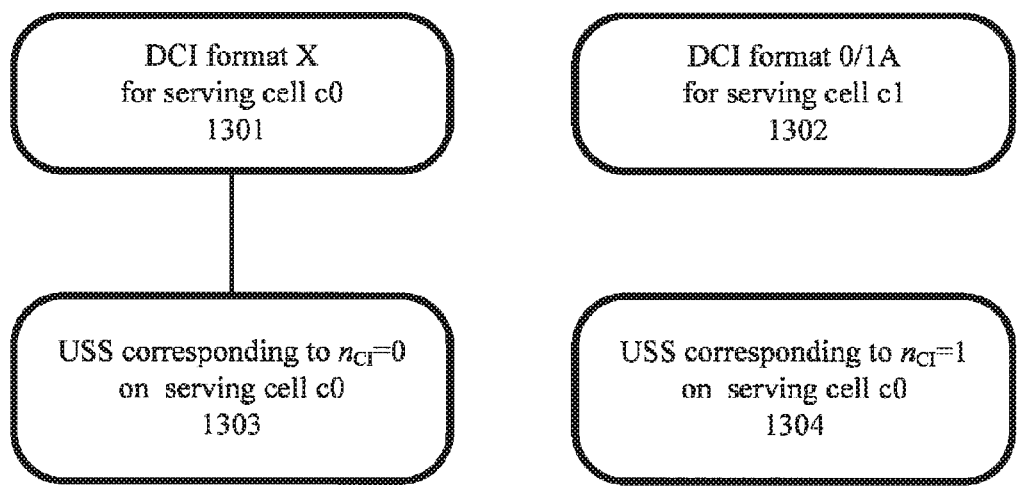
FIG. 14 is a diagram illustrating a correspondence between the DCI format and the USS in a case that the monitoring of the DCI format 0/1A for the serving cell c1 corresponding to the CIF value 1 is deactivated, according to the present embodiment.

FIG. 14 is a diagram illustrating a correspondence between the DCI format and the USS in a case that the monitoring of the DCI format 0/1A for the serving cell c1 corresponding to the CIF value 1 is deactivated, according to the present embodiment.

Figure 15:
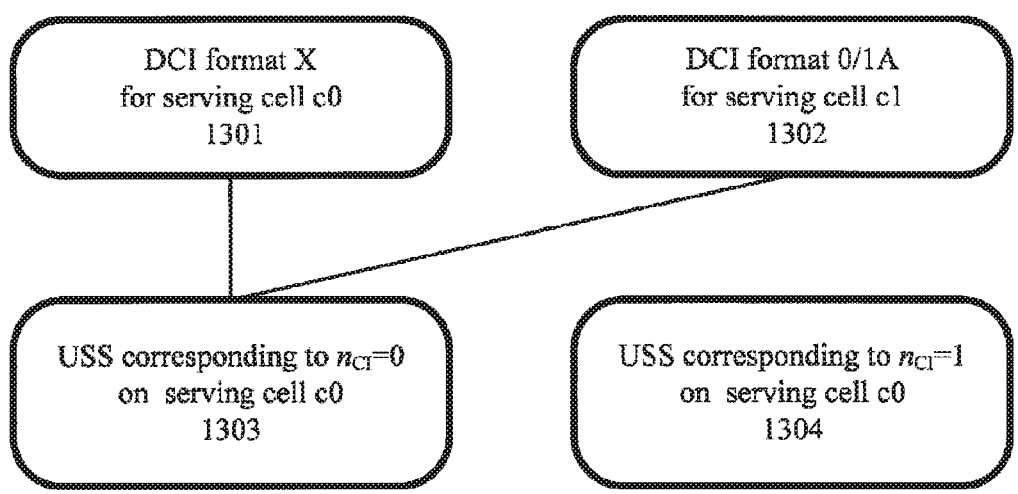
FIG. 15 is a diagram illustrating a correspondence between the DCI format and the USS in the case that the monitoring of the DCI format 0/1A for the serving cell c1 corresponding to the CIF value 1 is deactivated, according to the present embodiment.

FIG. 15 is a diagram illustrating a correspondence between the DCI format and the USS in the case that the monitoring of the DCI format 0/1A for the serving cell c1 corresponding to the CIF value 1 is deactivated, according to the present embodiment.

In FIG. 13, FIG. 14, and FIG. 15, a payload size of a DCI format X for a serving cell c0 (1301) is the same as a payload size of the DCI format 0/1A for the serving cell c1 (1302).

In FIG. 13, FIG. 14, and FIG. 15, the payload size of the DCI format X of the serving cell c0 (1301) is the same as the payload size of the DCI format 0/1A for the serving cell c1 (1302). In FIG. 13, FIG. 14, and FIG. 15, the DCI format X may include the DCI format 0/1A and/or a DCI format other than the DCI format 0/1A. In FIG. 13, FIG. 14, and FIG. 15, regardless of whether the monitoring of the DCI format 0/1A for the serving cell c1 is deactivated, the terminal device 1 considers that there is a possibility that the DCI format X for the serving cell c0 (1301) is transmitted in the PDCCH candidates/EPDCCH candidates in a USS corresponding to a CIF value 0 on the serving cell c0 (1303). In a case that the terminal device 1 considers that there is a possibility of the DCI format is transmitted in the PDCCH candidates/EPDCCH candidates in the USS, the terminal device 1 attempts to decode a PDCCH in the PDCCH candidates/EPDCCH candidates in the USS, in accordance with the DCI format.

In FIG. 13, the terminal device 1 considers that there is a possibility that the DCI format X for the serving cell c0 (1301) is transmitted in the PDCCH candidates/EPDCCH candidates in any of the USS corresponding to the CIF value 0 on the serving cell c0 (1303) and a USS corresponding to a CIF value 1 on the serving cell c0 (1304). In FIG. 13, the terminal device 1 considers that there is a possibility that the DCI format 0/1A for the serving cell c1 (1302) is transmitted in the PDCCH candidates/EPDCCH candidates in any of the USS corresponding to the CIF value 0 on the serving cell c0 (1303) and the USS corresponding to the CIF value 1 in the serving cell c0 (1304).

In FIG. 14, the terminal device 1 considers that there is a possibility that the DCI format X for the serving cell c0 (1301) is transmitted in the PDCCH candidates/EPDCCH candidates in the USS corresponding to the CIF value 0 on the serving cell c0 (1303). In FIG. 13, the terminal device 1 considers that there is no possibility that the DCI format 0/1A for the serving cell c1 (1302) is transmitted in any of the USS corresponding to the CIF value 0 on the serving cell c0 (1303) and the USS corresponding to the CIF value 1 on the serving cell c0 (1304).

In FIG. 14, in a case that the monitoring of the DCI format 0/1A for the serving cell c1 (1302) is deactivated, the monitoring of the DCI format X (1301) having the same payload size as the payload size of the DCI format 0/1A (1302) is also deactivated in a USS based on the CIF value, to which the serving cell c1 corresponds. This can further reduce the load of the reception process by the terminal device 1.

In FIG. 15, the terminal device 1 considers that there is a possibility that the DCI format X for the serving cell c0 (1301) is transmitted in the PDCCH candidates/EPDCCH candidates in the USS corresponding to the CIF value 0 on the serving cell c0 (1303). In FIG. 15, the terminal device 1 considers that there is a possibility that the DCI format 0/1A for the serving cell c1 (1302) is transmitted in the PDCCH candidates/EPDCCH candidates in the USS corresponding to the CIF value 0 on the serving cell c0 (1303).

In FIG. 15, in the case that the monitoring of the DCI format 0/1A for the serving cell c1 (1302) is deactivated, the monitoring of the DCI format X (1301) having the same payload size as the payload size of the DCI format 0/1A (1302) is also deactivated in the USS based on the CIF value, to which the serving cell c1 corresponds. This can further reduce the load of the reception process by the terminal device 1.

In FIG. 15, regardless of the monitoring of the DCI format 0/1A for the serving cell c1 (1302) being deactivated, it is considered that there is a possibility that the DCI format 0/1A for the serving cell c1 (1302) is transmitted in the PDCCH candidates/EPDCCH candidates in the USS corresponding to the CIF value 0 on the serving cell c0 (1303). As a result, while the load of the reception process by the terminal device 1 is slightly increased, the degree of freedom in scheduling of the PDCCH including the DCI format in the base station device 3 is largely improved.

That is, the base station device 3 may transmit, to the terminal device 1, information/a parameter for instructing deactivation of the monitoring of the DCI format 0/1A for a certain serving cell in a USS based on a CIF value corresponding to the certain serving cell.

Structures of devices according to the present embodiment will be described below.

Figure 16:
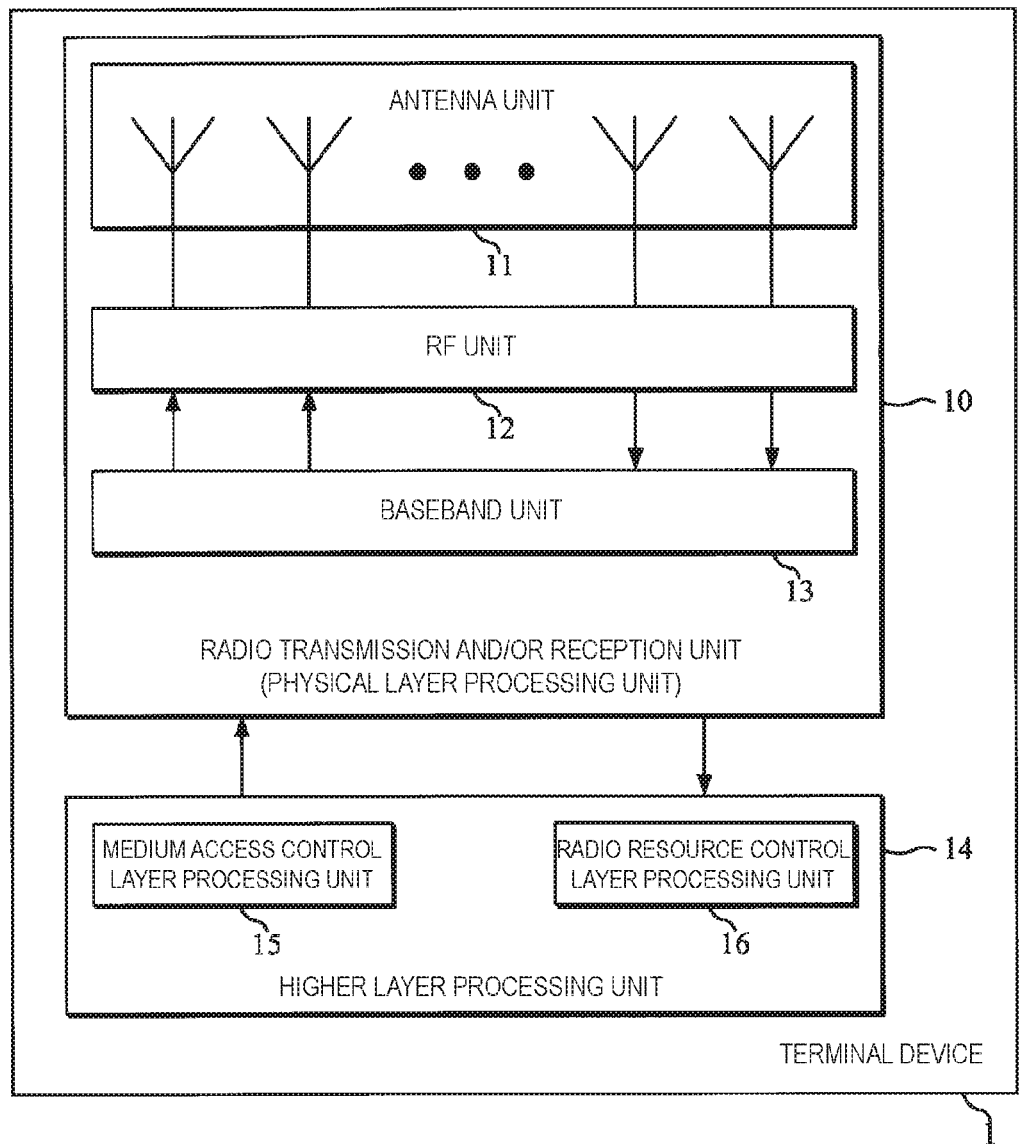
FIG. 16 is a schematic block diagram illustrating a constitution of a terminal device 1 according to the present embodiment.

FIG. 16 is a schematic block diagram illustrating a constitution of the terminal device 1 according to the present embodiment. As illustrated, the terminal device 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmission unit, a reception unit or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages the various types of configuration information/parameters of the terminal device 1. The radio resource control layer processing unit 16 sets the various types of configuration information/parameters, based on higher layer signaling received from the base station device 3. That is, the radio resource control layer processing unit 16 sets the various types of configuration information/parameters, based on information indicating the various types of configuration information/parameters received from the base station device 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station device 3, and outputs the information resulting from the decoding to the higher layer processing unit 14. The radio transmission and/or reception unit 10 modulates and codes data to generate a transmit signal, and transmits the transmit signal to the base station device 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier Transform (IFFT) on data, generates an SC-FDMA symbol, attaches a CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11. Furthermore, the RF unit 12 amplifies power. Furthermore, the RF unit 12 may have a function of controlling transmit power. The RF unit 12 is also referred to as a transmit power control unit.

Figure 17:
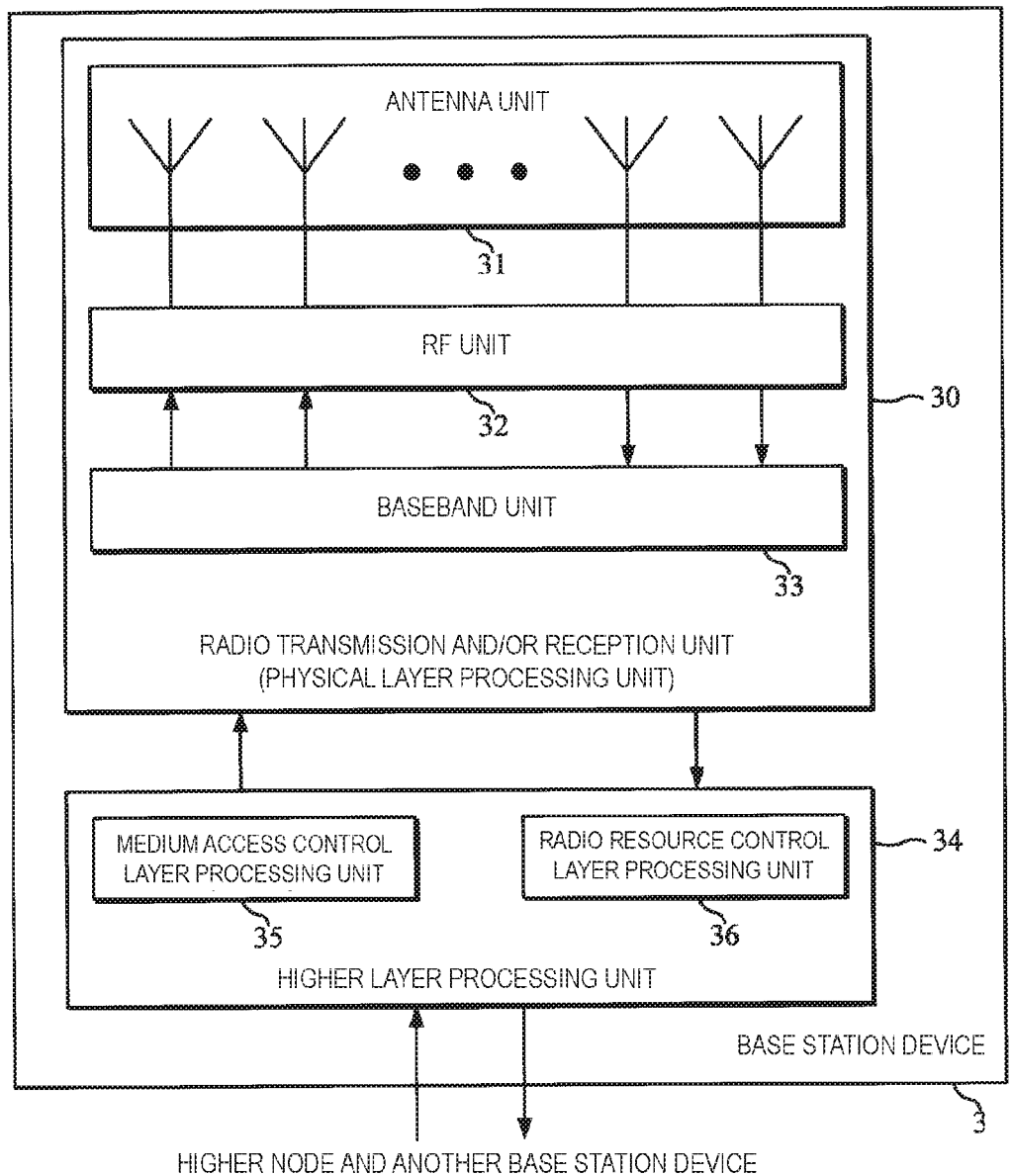
FIG. 17 is a schematic block diagram illustrating a constitution of a base station device 3 according to the present embodiment.

FIG. 17 is a schematic block diagram illustrating a constitution of the base station device 3 according to the present embodiment. As illustrated, the base station device 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmission unit, a reception unit or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) arranged on a physical downlink shared channel, system information, an RRC message, a MAC Control Element (CE), and the like, and outputs the generated or acquired data to the radio transmission and/or reception unit 30. Furthermore, the radio resource control layer processing unit 36 manages various types of configuration information/ parameters for each of the terminal devices 1. The radio resource control layer processing unit 36 may set various types of configuration information/parameters for each of the terminal devices 1 via the higher layer signaling. In other words, the radio resource control layer processing unit 36 transmits/broadcasts information indicating various types of configuration information/parameters.

The functionality of the radio transmission and/or reception unit 30 is similar to that of the radio transmission and/or reception unit 10, and hence description thereof is omitted.

Each of the units having the reference signs 10 to 16 included in the terminal device 1 may be configured as a circuit. Each of the units having the reference signs 30 to 36 included in the base station device 3 may be configured as a circuit.

Various aspects of the terminal device 1 and the base station device 3 according to the present embodiment will be described below.

(1) In a first aspect of the present embodiment, a terminal device 1 includes a reception unit 10 configured to: decode, based on a detection of a first PDCCH including a first DCI format including a first value of a CIF on a first serving cell, a first PDSCH in the first serving cell; and decode, based on a detection of a second PDCCH including a second DCI format including a second value of a CIF on the first serving cell, a second PDSCH in a second serving cell. In a case that monitoring of the second DCI format in the first serving cell is not deactivated and that a size of the first DCI format and a size of the second DCI format are the same, the reception unit 10 considers that there is a possibility that the first PDCCH including the first DCI format is transmitted in a USS given based on the second value. In a case that monitoring of the second DCI format in the first serving cell is deactivated and that the size of the first DCI format and the size of the second DCI format are the same, the reception unit 10 considers that there is no possibility that the first PDCCH including the first DCI format is transmitted in the USS given based on the second value. Here, the first DCI format may include a DCI format 0, a DCI format 1A, and/or a DCI format other than the DCI format 0/1A. Here, the second DCI format may include the DCI format 0 and/or the DCI format 1A.

(2) In the first aspect of the present embodiment, Cyclic Redundancy Check (CRC) parity bits scrambled with a Cell-Radio Network Temporary Identifier (C-RNTI) are attached to the first DCI format and the second DCI format.

(3) In the first aspect of the present embodiment, in the case that the monitoring of the second DCI format on the first serving cell is deactivated and that the size of the first DCI format and the size of the second DCI format are the same, the reception unit 10 considers that there is a possibility of the second PDCCH including the second DCI format being transmitted in a USS determined according to the first value.

(4) In the first aspect of the present embodiment, in the case that the monitoring of the second DCI format on the first serving cell is deactivated, the reception unit 10 considers that there is no possibility of the second PDCCH including the second DCI format being transmitted in the USS determined according to the second value.

(6) In a second aspect of the present embodiment, a base station device 3 includes a transmission unit 30 configured to: schedule, by using a first PDCCH including a first DCI format including a first value of CIF on a first serving cell, a first PDSCH in the first serving cell; and schedule, by using a second PDCCH including a second DCI format including a second value of a CIF on the first serving cell, a second PDSCH in a second serving cell. In a case that monitoring of the second DCI format in the first serving cell is not deactivated and that a size of the first DCI format and a size of the second DCI format are the same, the transmission unit 30 selects, from a USS given based on the first value and a USS given based on the second value, a resource to be transmitted by the first PDCCH including the first DCI format. In a case that the monitoring of the second DCI format in the first serving cell is deactivated and that the size of the first DCI format and the size of the second DCI format are the same, the transmission unit 30 selects, from the USS given based on the first value, a resource to be transmitted by the first PDCCH including the first DCI format. Here, the first DCI format may include a DCI format 0, a DCI format 1A, and/or a DCI format other than the DCI format 0/1A. Here, the second DCI format may include the DCI format 0 and/or the DCI format 1A.

(7) In the second aspect of the present embodiment, Cyclic Redundancy Check (CRC) parity bits scrambled with a Cell-Radio Network Temporary Identifier (C-RNTI) are attached to the first DCI format and the second DCI format.

(8) In the second aspect of the present embodiment, in the case that the monitoring of the second DCI format on the first serving cell is deactivated and that the size of the first DCI format and the size of the second DCI format are the same, the transmission unit 30 does not select, from the USS given based on the second value, a resource for transmitting the first PDCCH including the first DCI format.

(9) In the second aspect of the present embodiment, in the case that the monitoring of the second DCI format on the first serving cell is deactivated and that the size of the first DCI format and the size of the second DCI format are the same, the transmission unit 30 selects, from the USS given based on the first value, a resource for transmitting the second PDCCH including the second DCI format.

(10) In the second aspect of the present embodiment, in the case that the monitoring of the second DCI format on the first serving cell is deactivated, the transmission unit 30 does not select a resource for transmitting the second PDCCH including the second DCI format in the USS given based on the second value.

(11) In a third aspect of the present embodiment, a terminal device 1 includes a reception unit 10 configured to: attempt to decode, in a first User Equipment-specific Search Space (USS) on a first serving cell, a Physical Downlink Control Channel (PDCCH) for the first serving cell; and attempt to decode, in a second USS on any one of the first serving cell or a second serving cell, a PDCCH for the second serving cell. The number of PDCCH candidates included in the first USS is given based on a first parameter. In a case that the reception unit 10 attempts to decode the PDCCH for the second serving cell in the second USS on the first serving cell, the number of PDCCH candidates included in the second USS is given based on the first parameter. In a case that the reception unit 10 attempts to decode the PDCCH for the second serving cell in the second USS on the second serving cell, the number of PDCCH candidates included in the second USS is given based on a second parameter different from the first parameter.

(12) In a fourth aspect of the present embodiment, a terminal device 1 includes a reception unit 10 configured to: attempt to decode, in a first User Equipment-specific Search Space (USS) on a first serving cell, a Physical Downlink Control Channel (PDCCH) for the first serving cell; and attempt to decode, in a second USS on the first serving cell, a PDCCH for a second serving cell. The number of PDCCH candidates included in the first USS is given based on a first parameter. The number of PDCCH candidates included in the second USS is given based on a second parameter different from the first parameter.

(11) In a fifth aspect of the present embodiment, a base station device 3 includes a transmission unit 30 configured to: transmit, in a first User Equipment-specific Search Space (USS) on a first serving cell, a Physical Downlink Control Channel (PDCCH) for the first serving cell; and transmit, in a second USS on any one of the first serving cell and a second serving cell, a PDCCH for the second serving cell. The number of PDCCH candidates included in the first USS is given based on a first parameter. In a case that the transmission unit 30 transmits the PDCCH for the second serving cell in the second USS on the first serving cell, the number of PDCCH candidates included in the second USS is given based on the first parameter. In a case that the transmission unit 30 transmits the PDCCH for the second serving cell in the second USS on the second serving cell, the number of PDCCH candidates included in the second USS is given based on a second parameter different from the first parameter.

(12) In a sixth aspect of the present embodiment, a base station device 3 includes a transmission unit 30 configured to: transmit, in a first User Equipment-specific Search Space (USS) on a first serving cell, a Physical Downlink Control Channel (PDCCH) for the first serving cell; and transmit, in a second USS on the first serving cell, a decode of a PDCCH for a second serving cell. The number of PDCCH candidates included in the first USS is given based on a first parameter. The number of PDCCH candidates included in the second USS is given based on a second parameter different from the first parameter.

Consequently, the terminal device and the base station device can efficiently communicate with each other by using a downlink channel.

The base station device 3 according to the present invention can also be realized as an aggregation (a device group) constituted of multiple devices. Each of the devices constituting such a device group may include some or all portions of each function or each functional block of the base station device 3 according to the above-described embodiment. The device group may include each general function or each functional block of the base station device 3. Furthermore, the terminal device 1 according to the above-described embodiment can also communicate with the base station device as the aggregation.

Furthermore, the base station device 3 according to the above-described embodiment may serve as an Evolved Universal Terrestrial Radio Access Network (EUTRAN). Furthermore, the base station device 3 according to the above-described embodiment may have some or all portions of the functions of a node higher than an eNodeB.

A program running on a device according to the present invention may serve as a program that controls a Central Processing Unit (CPU) and the like, and causes a computer to operate in such a manner as to realize the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the devices in the above-described embodiment may be partially enabled by a computer. In such a case, a program for realizing such control functions may be recorded on a computer-readable recording medium to cause a computer system to read the program recorded on the recording medium for execution. It is assumed that the "computer system" refers to a computer system built into the devices, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the devices used in the above-described embodiment may be mounted or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, devices have been described as an example, but the invention of the present application is not limited to these devices, and is applicable to a terminal device or a communication device of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatus.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

DESCRIPTION OF REFERENCE NUMERALS 1 (1A, 1B, 1C) Terminal device
3 Base station device
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:
1. A terminal device comprising:
antenna circuitry configured to receive a Physical Downlink Control Channel (PDCCH); and
reception circuitry configured to monitor, in a subframe k, a first set $S_{k1}^{(L)}$ of first PDCCH candidates and a second set $S_{k2}^{(L)}$ of second PDCCH candidates, wherein
the first set $S_{k1}^{(L)}$ corresponds to a first Carrier Indicator Field (CIF) value $n_{CI}$ and a first aggregation level L,
the second set $S_{k2}^{(L)}$ corresponds to a second CIF value $n_{CI}$ and the first aggregation level L,
a first number $M_{c1}^{(L)}$ of the first PDCCH candidates is given based on at least a first coefficient $\alpha_{c1}$ indicated by first information and a value $M^{(L)}$, the value $M^{(L)}$ is a predetermined value corresponding to the first aggregation level L,
a second number $M_{c2}^{(L)}$ of the second PDCCH candidates is given based on at least a second coefficient $\alpha_{c2}$ indicated by second information and the value $M^{(L)}$, and
first Control Channel Element(s) (CCE(s)) corresponding to an m-th first PDCCH candidate of the first PDCCH candidates included in the first set $S_{k1}^{(L)}$ and second CCE(s) corresponding to an m-th second PDCCH candidate of the second PDCCH candidates included in the second set $S_{k2}^{(L)}$ are given by expressions below:

$$L\{(Y_k+m') \bmod \text{floor}(N_{CCE,k}/L)\}+i$$

where i=0, 1, . . . , L−1

$$m'=m+M^{(L)} \cdot n_{CI}$$

where m=0, 1, . . . , $M_c^{(L)}-1$
where $M_c^{(L)}$ is i) $M_{c1}^{(L)}$ in a case that the first coefficient $\alpha_{c1}$ is indicated by the first information or ii) $M_{c2}^{(L)}$ in a case that the second coefficient $\alpha_{c2}$ is indicated by the second information, and $$Y_k=(A \cdot Y_{k-1}) \bmod D$$

where $Y_{-1} = n_{RNTI} \neq 0$, $A = 39827$, $D = 65537$, $k = \text{floor}(n_s/2)$ where $N_{CCE,k}$ is a total number of CCEs including at least the first CCE in the subframe k and the second CCE in the subframe k, floor is a function for returning a value obtained by truncating an input value below a decimal point, and A mod B is a function for returning a remainder obtained by dividing A by B.

2. A base station device comprising:

transmission circuitry configured to code Downlink Control Information to be transmitted using a Physical Downlink Control Channel (PDCCH); and antenna circuitry configured to transmit the PDCCH in each of a first set $S_{k1}^{(L)}$ of first PDCCH candidates and a second set $S_{k2}^{(L)}$ of second PDCCH candidates in a subframe k, wherein the first set $S_{k1}^{(L)}$ corresponds to a first Carrier Indicator Field (CIF) value $n_{CI}$ and a first aggregation level L, the second set $S_{k2}^{(L)}$ corresponds to a second CIF value $n_{CI}$ and the first aggregation level L, a first number $M_{c1}^{(L)}$ of the first PDCCH candidates is given based on at least a first coefficient $\alpha_{c1}$ indicated by first information and a value $M^{(L)}$, the value $M^{(L)}$ is a predetermined value corresponding to the first aggregation level L, a second number $M_{c2}$ of the second PDCCH candidates is given based on at least second coefficient $\alpha_{c2}$ indicated by second information and the value $M^{(L)}$, and first Control Channel Element(s) (CCE(s)) corresponding to an m-th first PDCCH candidate of the first PDCCH candidates included in the first set $S_{k1}^{(L)}$ and second CCE(s) corresponding to an m-th second PDCCH candidate of the second PDCCH candidates included in the second set $S_{k2}^{(L)}$ are given by expressions below:

$$L\{(Y_k+m') \bmod \text{floor}(N_{CCE,k}/L)\}+i$$

where $i = 0, 1, \ldots, L-1$ $$m' = m + M^{(L)} \cdot n_{CI}$$

where $m = 0, 1, \ldots, M_c^{(L)}-1$ where $M_c^{(L)}$ is i) $M_{c1}^{(L)}$ in a case that the first coefficient $\alpha_{c1}$ is indicated by the first information or ii) $M_{c2}^{(L)}$ in a case that the second coefficient $\alpha_{c2}$ is indicated by the second information, and $$Y_k = (A \cdot Y_{k-1}) \bmod D$$

where $Y_{-1} = n_{RNTI} \neq 0$, $A = 39827$, $D = 65537$, $k = \text{floor}(n_s/2)$ where $N_{CCE,k}$ is a total number of CCEs including at least the first CCE in the subframe k and the second CCE in the subframe k, floor is a function for returning a value obtained by truncating an input value below a decimal point, and A mod B is a function for returning a remainder obtained by dividing A by B.

3. A communication method to be used for a terminal device, the communication method comprising:

receiving a Physical Downlink Control Channel (PDCCH); and monitoring, in a subframe k, a first set $S_{k1}^{(L)}$ of first PDCCH candidates and a second set $S_{k2}^{(L)}$ of second PDCCH candidates, wherein the first set $S_{k1}^{(L)}$ corresponds to a first Carrier Indicator Field (CIF) value $n_{CI}$ and a first aggregation level L, the second set $S_{k2}^{(L)}$ corresponds to a second CIF value $n_{CI}$ and the first aggregation level L, a first number $M_{c1}^{(L)}$ of the first PDCCH candidates is given based on at least a first coefficient $\alpha_{c1}$ indicated by first information and a value $M^{(L)}$, the value $M^{(L)}$ is a predetermined value corresponding to the first aggregation level L, a second number $M_{c1}^{(L)}$ of the second PDCCH candidates is given based on at least a second coefficient $\alpha_{c2}$ indicated by second information and the value $M^{(L)}$, and first Control Channel Element(s) (CCE(s)) corresponding to an m-th first PDCCH candidate of the first PDCCH candidates included in the first set $S_{k1}^{(L)}$ and second CCE(s) corresponding to an m-th second PDCCH candidate of the second PDCCH candidates included in the second set $S_{k2}^{(L)}$ are given by expressions below:

$$L\{(Y_k+m') \bmod \text{floor}(N_{CCE,k}/L)\}+i$$

where $i = 0, 1, \ldots, L-1$ $$m' = m + M^{(L)} \cdot n_{CI}$$

where $m = 0, 1, \ldots, M_c^{(L)}-1$, where $M_c^{(L)}$ is i) $M_{c1}^{(L)}$ in a case that the first coefficient $\alpha_{c2}$ is indicated by the first information or ii) $M_{c2}^{(L)}$ in a case that the second coefficient $\alpha_{c2}$ is indicated by the second information, and $$Y_k = (A \cdot Y_{k-1}) \bmod D$$

where $Y_{-1} = n_{RNTI} \neq 0$, $A = 39827$, $D = 65537$, $k = \text{floor}(n_s/2)$ where $N_{CCE,k}$ is a total number of CCEs including at least the first CCE in the subframe k and the second CCE in the subframe k, floor is a function for returning a value obtained by truncating an input value below a decimal point, and A mod B is a function for returning a remainder obtained by dividing A by B.

4. A communication method to be used for a base station device, the communication method comprising:

coding Downlink Control Information transmitted using a Physical Downlink Control Channel (PDCCH); and transmitting the PDCCH in each of a first set $S_{k1}^{(L)}$ of first PDCCH candidates and a second set $S_{k2}^{(L)}$ of second PDCCH candidates in a subframe k, wherein the first set $S_{k1}^{(L)}$ corresponds to a first Carrier Indicator Field (CIF) value $n_{CI}$ and a first aggregation level L, the second set $S_{k2}^{(L)}$ corresponds to a second CIF value $n_{CI}$ and the first aggregation level L, a first number $M_{c1}^{(L)}$ of the first PDCCH candidates is given based on at least a first coefficient $\alpha_{c1}$ indicated by first information and a value $M^{(L)}$, the value $M^{(L)}$ is a predetermined value corresponding to the first aggregation level L, a second number $M_{c2}^{(L)}$ of the second PDCCH candidates is given based on at least a second coefficient $\alpha_{c2}$ indicated by second information and the value $M^{(L)}$, and first Control Channel Element(s) (CCE(s)) corresponding to an m-th first PDCCH candidate of the first PDCCH candidates included in the first set $S_{k1}^{(L)}$ and second CCE(s) corresponding to an m-th second PDCCH candidate of the second PDCCH candidates included in the second set $S_{k2}^{(L)}$ are given by expressions below:

$$L\{(Y_k+m') \bmod \text{floor}(N_{CCE,k}/L)\}+i$$

where i=0, 1, ..., L−1

$$m' = m + M^{(L)} \cdot n_{CI}$$

where m=0, 1, ..., $M_c^{(L)}-1$, where $M_c^{(L)}$ is i) $M_{C1}^{(L)}$ in a case that the first coefficient $\alpha_{C1}$ is indicated by the first information or ii) $M_{c2}^{(L)}$ in a case that the second coefficient $\alpha_{c2}$ is indicated by the second information, and $$Y_k = (A \cdot Y_{k-1}) \bmod D$$

where
$Y_{-1} = n_{RNTI} \neq 0$, A=39827, D=65537, k=floor($n_s/2$)
where $N_{CCE,k}$ is a total number of CCEs including at least the first CCE in the subframe k and the second CCE in the subframe k,
floor is a function for returning a value obtained by truncating an input value below a decimal point, and
A mod B is a function for returning a remainder obtained by dividing A by B.

\* \* \* \* \*